Dec. 4, 1951  D. P. FAULK  2,577,411
SEQUENCE AND WELDING TIMER
Filed Jan. 31, 1950  7 Sheets-Sheet 1

INVENTOR
DONALD P. FAULK
BY
ATTORNEY

INVENTOR
DONALD P. FAULK
BY
ATTORNEY

Dec. 4, 1951  D. P. FAULK  2,577,411
SEQUENCE AND WELDING TIMER
Filed Jan. 31, 1950  7 Sheets-Sheet 3

INVENTOR
DONALD P. FAULK
BY
ATTORNEY

INVENTOR
DONALD P. FAULK
BY
ATTORNEY

Dec. 4, 1951  D. P. FAULK  2,577,411
SEQUENCE AND WELDING TIMER
Filed Jan. 31, 1950  7 Sheets-Sheet 6

INVENTOR
DONALD P. FAULK
BY
ATTORNEY

Dec. 4, 1951   D. P. FAULK   2,577,411
SEQUENCE AND WELDING TIMER
Filed Jan. 31, 1950   7 Sheets-Sheet 7

INVENTOR
DONALD P. FAULK
BY
ATTORNEY

Patented Dec. 4, 1951

2,577,411

UNITED STATES PATENT OFFICE 2,577,411

SEQUENCE AND WELDING TIMER

Donald P. Faulk, Lexington, Mass., assignor to Raytheon Manufacturing Company, Newton, Mass., a corporation of Delaware Application January 31, 1950, Serial No. 141,518

25 Claims. (Cl. 315—246)

This invention relates to electronic timers for use in resistance welding.

In the past, weld and sequence timers for use in resistance welding have been relatively bulky and expensive. A primary reason for this has been the relatively large number of electronic tubes and relays required to perform the necessary functions. The present invention, through novel circuit arrangements, has succeeded in achieving these timing functions very accurately with a much smaller number of control relays and tubes than have heretofore been used for comparable functions. Such a drastic reduction in tube and relay requirements has also resulted in similar reductions in necessary wiring and in manufacturing time, thereby materially adding the additional advantage of reduced space requirements and manufacturing costs.

In addition to the above advantages, the invention makes use of a novel arrangement for synchronous operation with line voltage and is adapted for both synchronous and nonsynchronous operation, and for both pulsation and spot-welding at speeds substantially higher than heretofore possible. The embodiments adapted for synchronous operation are inherently full cycling. The embodiments adapted for pulsation welding automatically time only an integral number of "heat" times. Self-compensating features in the system insure accuracy in sequence and weld timing despite poor line voltage conditions, temperature variations, or dust accumulation.

The invention achieves these advantages by providing generally a cascade arrangement of controlled-ignition gas-filled discharge devices in sequence-timing circuits. The operation of each such device is dependent upon the operation of the device preceding it in the cascade arrangement. A single switch in the circuit of the leading device thereby effectively controls the termination of the operation of the entire cascade arrangement.

By providing two such discharge devices, each cascaded upon a single discharge device and a resistance in the path leading from the single to the two devices, an effective means for making the operation and therefore the functions of the two devices, dependent upon each other, is provided. This desirable construction in the present invention has been adapted for both synchronous and nonsynchronous operation with alternating line voltage.

Peaking circuits for synchronizing operation with line voltage have been used to trigger grid-controlled gas-filled discharge devices in novel arrangements of inverter-operated circuits.

A novel arrangement of inductive coils with the sequence-timing circuits achieves simplicity in operation and economy in construction.

A permanent grid-biasing arrangement has also been provided for insuring stability of operation, regardless of possible mechanical contact bounce.

The foregoing and other objects, features and advantages of the invention will become more apparent from the following description, taken in connection with the accompanying drawings wherein.

Figure 1:
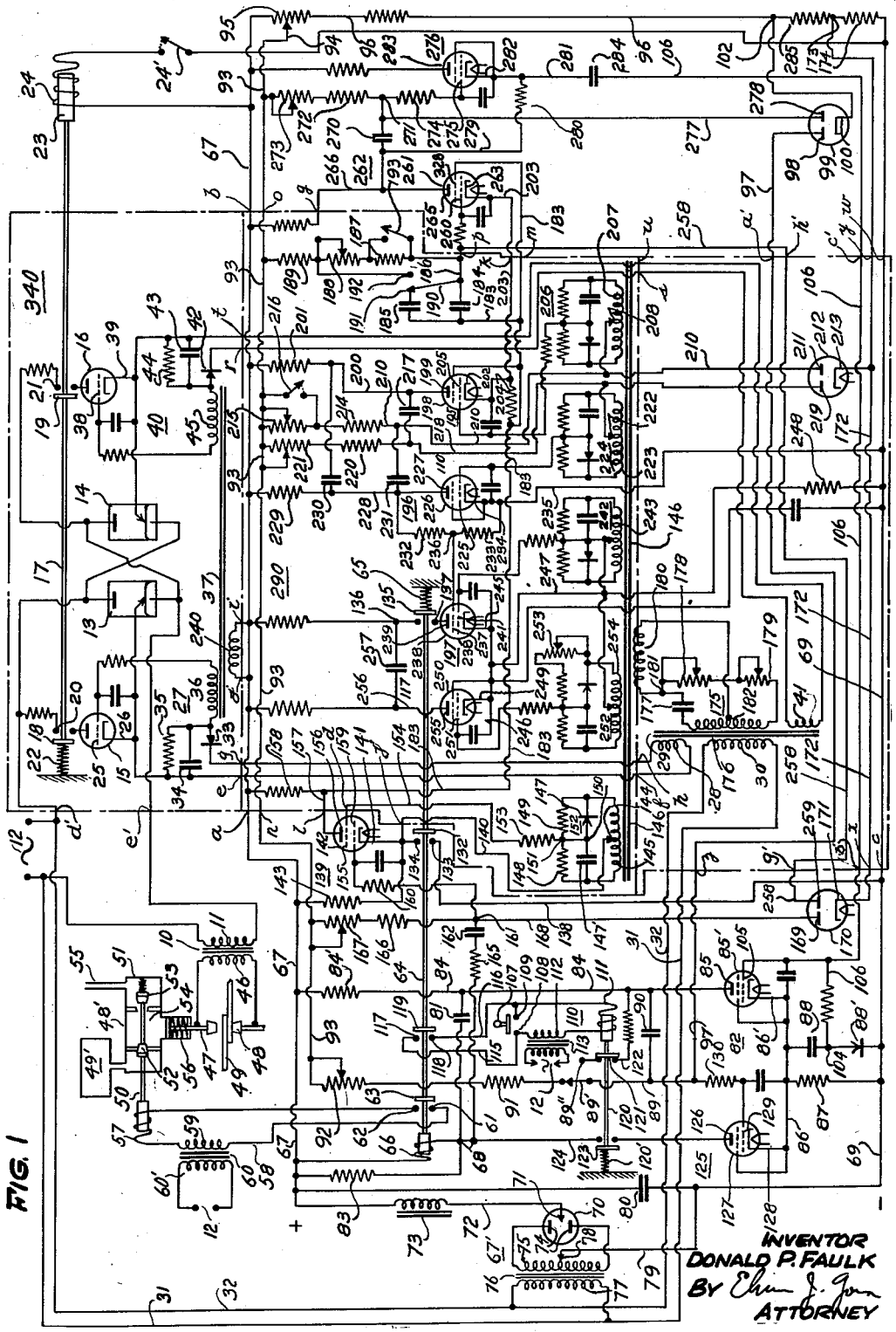
Fig. 1 is a schematic view of a preferred embodiment of the invention particularly adapted for pulsation and spot-welding in synchronous operation with alternating line voltage.

Referring to the drawings in more detail, Fig. 1 shows a welding transformer 10 having a primary 11 adapted to be connected to a source of alternating current 12 which may be any suitable alternating current source. A pair of inverse parallel-connected ignitrons 13 and 14 are connected in series with the primary winding 11 and alternating current source 12. Grid-controlled gaseous discharge devices, as, for example, thyratrons 15 and 16, are connected for firing the ignitrons 13 and 14, respectively, in a conventional manner as shown. An operator 17 may be arranged to provide a "weld" (and "no weld") switching arrangement by providing contacts 18 and 19 on operator 17 for selectively connecting or disconnecting thyratrons 15 and 16 from the current source 12, as at points 20 and 21. The tension spring 22 may be used to maintain the contacts 18 and 19 normally in the open position as shown. The operator 17 may be closed by means of a core 23 in a solenoid 24 connected to a potential source and controlled by switch 24'.

Grid 25 of thyratron 15 is maintained normally at a potential negative with respect to cathode 26 by a normally constant potential biasing circuit 27 connected across the grid 25 and cathode 26. Constant potential circuit 27 may consist of a transformer secondary 28, of a transformer 29 whose primary 30 is connected by lines 31 and 32 leading to the alternating current source 12, in series with a rectifying device 33 and a smoothing capacitance 34 and leakage resistance 35 connected in parallel across the series-connected secondary 28 and rectifier 33. A triggering secondary 36 of a triggering transformer 37 whose operation is to be hereinafter described is, in this instance, connected in series in the grid-biasing circuit 27.

Similarly, grid 38 of thyratron 16 is normally held at a negative potential with respect to cathode 39 by a grid-biasing circuit 40. The biasing circuit 40 has a transformer secondary 41 of transformer 29 connected in series with a rectifying device 42. A smoothing capacitor 43 and resistance 44 are connected in parallel across the series-connected rectifier 42 and transformer secondary 41. This parallel-connected constant potential source is connected across the cathode 39 and grid 38 of thyratron 16 in series with a triggering secondary 45 of the triggering transformer 37. Secondary 46 of the welding transformer 10 is connected across electrodes 47 and 48 of a type suitable for passing current through a weld resistance load 49. One of the terminals 47 is operatively connected to a device 48' for closing the terminals 47 and 48 with sufficient pressure to subject the weld resistance load 49 to a squeeze load, thereby producing suitable welding contact. In this instance, the device 48' is a valve arrangement for controlling a pressure source such as air source 49'. The operator 50 is normally held in the open position by a tension spring 51. In this position, valve 52 is closed and seals off the air pressure source 49', and valve 53 is open, permitting escape of air pressure from the pressure chamber 54 above the terminal 47 through the outlet 55. In this position, the compression spring 56 lifts the terminal 47 away from the welding load 49. When the solenoid 57 is energized, operator 50 is caused to move to the left, thus opening the valve 52 and closing the valve 53, thereby causing air pressure from the pressure source 49' to force the terminal 47 down upon the welding load 49 at a proper weld squeezing pressure. One side of the energizing solenoid 57 is connected by a line 58 through the secondary 59 of transformer 60, whose primary 60' is connected across the alternating potential source 12, to the terminal 61. The other side of the energizing solenoid 57 is connected to the terminal 62. A contactor 63 on a sequence-initiating operator 64 will normally leave terminals 61 and 62 open because of the tension spring 65. A solenoid 66 for moving the operator 64 to the left is connected between line 67 and point 68. Line 67 is maintained at a positive potential by a constant potential source circuit 67' connected between lines 67 and 69. A suitable constant potential source circuit in this instance consists of a full-wave rectifying device 70 with a cathode 71 connected by line 72 through a smoothing reactance coil 73 to the line 67. Anodes 74 of the full-wave rectifying device 70 are connected across a secondary 75 of a transformer 76 whose primary 77 is connected across the alternating current source 12 by means of lines 31 and 32. Mid-point 78 of the transformer secondary 75 is connected by line 79 to the line 69 which is thereby maintained at a negative potential with respect to line 67. A smoothing capacitance 80 is connected across lines 67 and 69.

A snuffing condenser 81 in a stand-by and repeat circuit 82 has one of its sides connected through point 68 and a resistance 83 to line 67. The other side of the snuffing condenser 81 is connected to line 84, one end of which leads through a resistance 84' to the positive potential line 67, and the other end of which leads to anode 85 of a controlled-ignition gas-filled discharge device such as a thyratron 85'. Cathode 86' of thyratron 85' is connected through line 86 and resistance 87 to the negative potential line 69. A grid-biasing capacitor 88 in series with a rectifying device 88' is also connected across the resistance 87 between line 86 and the negative potential line 69. The off-time and repeat circuit 82 has additionally a grid-biasing capacitor 90, one side of which is connected to line 84 and the other side of which is connected to line 89 which leads through repeat switch 89', resistance 91, potentiometer resistance 92 to one end of line 93, the other end of which runs through variable contact arm 94 to potentiometer resistance 95 on voltage divider line 96, which is connected between positive and negative potential lines 67 and 69. The same side of grid-biasing capacitor 90 is also connected through line 89 to line 97 which runs to anode 98 of a rectifying device 99 having a cathode 100 connected to point 102 on the voltage divider line 96. When a potential first appears between lines 67 and 69 from source 67', the positive potential of line 67 appears through resistance 84' and line 84 at anode 85 of the off-time and repeat circuit thyratron 85' and the negative potential of line 69 will appear through resistance 87 and line 86 at the cathode 86' of thyratron 85'. Therefore, as soon as the cathode 86' is warm, thyratron 85' will begin to conduct through the circuit consisting of line 67, resistance 84', line 84, anode 85, cathode 86', line 86, resistance 87 to negative potential line 69. As soon as thyratron 85' begins to conduct, a potential will appear across resistance 87 between lines 86 and 69, thereby causing the grid-biasing capacitor 88 to charge through rectifier 88' to produce a normally negative potential at point 104 with respect to the potential of line 86. Control grid 105 of the thyratron 89 is connected to a line 106 leading from point 104. Therefore, the grid 105 will become negative with respect to the cathode 86' as soon as the thyratron 85' starts to conduct, and, because of the directional nature of the rectifying device 88', will normally remain negative with respect to the cathode 86' despite certain conditions to be hereinafter described. When the thyratron 85' conducts, the grid-biasing capacitor 90 will charge so as to acquire a positive potential on the side 89 and a negative potential on the side 84 by means of the circuit consisting of positive potential line 67 and portion of potentiometer resistance 95, adjustable arm 94, line 93, potentiometer resistance 92, resistance 91, repeat switch 89', line 89, capacitance 90, line 84, anode 85, cathode 86', line 86, resistance 87 and negative potential line 69. However, the side 89 of the grid-biasing capacitance 90 will be maintained at a potential only slightly positive with respect to line 86 because the side 89 of condenser 90 is also connected through line 89, line 97 and the rectifying device 99 to point 102 on the voltage divider line 96. Therefore, the maximum positive potential to which the side 89 of condenser 95 will charge is approximately that of point 102 since the drop across the rectifying device 99 is small. Also when the thyratron 85' conducts, the snuffing capacitor 81 will charge with a positive potential at the point 68 with respect to 84 through the circuit consisting of positive potential line 67, resistance 83, point 68, snuffing capacitance 81, line 84, anode 85, cathode 86', line 86, resistance 87 and negative potential line 69.

Figure 5:
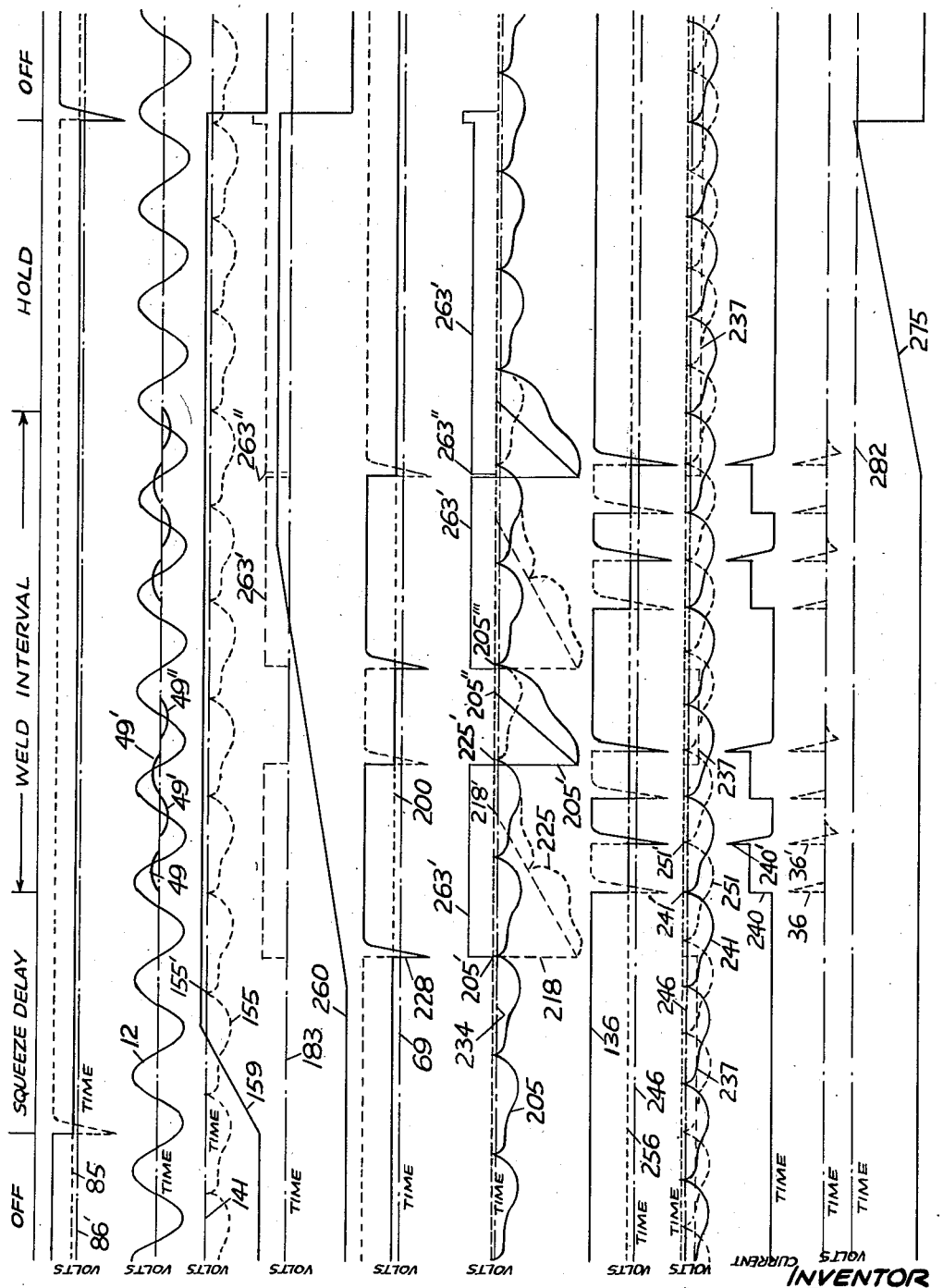
Fig. 5 shows curves illustrating the operation of Fig. 1.

To start the sequence timer, a switch, as, for example, foot switch 107, is depressed to close points 108 and 109 of the starter switch circuit 110 which may consist of a solenoid 111 in series with the secondary 112 of a transformer 113, whose primary 114 may be connected across the alternating current source 12, and lines 115 and 116 running to terminals 117 and 118 controlled by contactor 119 of operator 64 in such manner that when operator 64 moves to the left, terminals 117 and 118 are closed and seal off the switch 107. When the foot switch 107 is depressed, current flows in the starter switch circuit 110, thereby energizing the solenoid 111 and causing the operator 120 to move to the right against the force of tension spring 120' so as to cause a contactor 121 to open the line 122 and the contactor 123 to close the line 124 which has one end connected to point 68 and the other end connected to an anode 126 of a controlled-ignition gas-filled discharge device such as a thyratron 127 in a sequence-initiating circuit 125. Cathode 128 of the thyratron 127 is connected through the line 86 and resistance 87 to the negative potential line 69. Since point 68 is connected through resistance 83 and solenoid 66 to the positive potential line 67, the potential between lines 67 and 86 will appear across the anode 126 and cathode 128. Also since grid 129 of thyratron 127 is connected through resistance 130 and line 89 to the positive side of the grid-biasing capacitor 90, the grid 129 will be slightly positive with respect to the cathode 128 and the thyratron 127 will, therefore, when switch 107 is closed, immediately begin to conduct current from positive potential line 67 through the sequence-initiating circuit 125, consisting of resistance 83, solenoid coil 66, point 68, line 124, contactor 123, anode 126, cathode 128, line 86, resistance 87 to negative line 69. Since the drop in potential across the thyratron 127, when it conducts is relatively small, the potential of point 68 will suddenly drop to nearly the potential of line 86. Since the snuffing capacitance 81 cannot instantaneously discharge, the sudden drop in potential at point 68 will thereby cause the potential in line 84 and anode 85 to experience a large negative drop to a point below the potential of line 86 and cathode 86', thereby causing the current flow in thyratron 85' to be extinguished. This negative drop is shown in Fig. 5 at the beginning of curve 85, which shows the potential of anode 85 with respect to cathode 86' whose potential is illustrated by curve 86'. Since, as already pointed out, the grid 105 of thyratron 85' is negative with respect to cathode 86', the thyratron 85' cannot again conduct, even after the snuffing condenser 81 has discharged, and the potential between lines 67 and 86 again appears across the anode 85 and cathode 86'.

The moment the thyratron 127 is caused to conduct, current flows through the coil 66 causing the operator 64 to move to the left, thereby causing the contactor 63 to close the gap between terminals 61 and 62 so that current is made to flow from transformer 60 to energize the solenoid 57. The operator 50 is made thereby to move to the left opening valve 52 to the high pressure source 49 so as to exert pressure upon the electrode 47. When operator 64 moved to the left, contactor 119 closed the gap between the terminals 117 and 118, thereby sealing off the foot switch 107 to prevent sequence interruption by switch 107. Simultaneously, contactor 132 on the operator 64 closes the gap between terminals 133 and 134, and a contactor 135 on operator 64 closes the gap between terminals 136 and 137. The terminal 133 is on one end of a line 138 in "weld time" circuit 139, the other end of which is connected to the negative potential line 69. The terminal 134 is connected to line 140 which is also connected to a cathode 141 of a controlled-ignition gas-filled discharge device as thyratron 142. One end of line 140 is connected through resistance 143 to the positive potential line 67 and the other end of line 140 is connected to the mid-point 144 of secondary 145 of a timing transformer 146. The secondary 145 is connected in parallel with a series-connected capacitance 147' and rectifying device 147 and two series resistances 148 and 149. Mid-points 150 and 151 of resulting voltage peaking grid-biasing circuit 152 are connected through a resistance 153 to a shield grid 155 of the thyratron 142. Anode 156 of thyratron 142 is connected by line 157 and resistance 158 to the positive potential line 67. Grid 159 of thyratron 142 is connected through resistance 160 to point 161 on one side of "squeeze-time" delay condenser 162 in the sequence initiating and "squeeze-time" delay circuit 125. The other side of condenser 162 is connected through current limiting resistance 165 to the point 68. The point 161 on one side of condenser 162 is connected through resistance 166 and potentiometer resistance 167 to the line 93 and through line 168 to anode 169 of a rectifying device 170 having a cathode 171 connected by line 172 to point 173 on the voltage divider line 96. Because of the rectifying device 170, the point 161 will have a maximum positive potential approximately that of point 173 on the voltage divider line 96 fixed slightly positive with respect to line 69. Since the control grid 159 of thyratron 142 is connected through resistance 160 to the point 161, the grid 159 will therefore be at a potential slightly positive with respect to negative potential line 69. When the potential first appeared across lines 67 and 69, the "squeeze delay" condenser 162 is charged with the side 68 positive with respect to the side 161 through the circuit consisting of line 67, resistance 83, inductance coil 66, point 68, resistance 165, "squeeze-delay" capacitance 162, point 161, line 168, anode 169, cathode 171, line 172, point 173, resistance 179 and negative potential line 69. At the moment that thyratron 127 started to conduct, the point 68 experienced a sudden drop in potential. Capacitance 162 being unable to instantaneously discharge, the point 161 was forced far negative with respect to line 69. The control grid 159 of thyratron 142, being connected to point 161, was thereby correspondingly forced far negative with respect to line 69. Thus, even though operator 64 caused the negative potential of line 69 to appear at cathode 141, the thyratron nevertheless will not fire. Since the point 161 also became negative with respect to line 172, the rectifying device 170 ceased conducting and the "squeeze-delay" condenser 162 immediately began discharging through the circuit consisting of line 67, part of resistance 95, adjusting arm 94, line 93, potentiometer resistance 167, resistance 166, point 161, "squeeze-delay" condenser 162, resistance 165, point 68, line 124, contactor 123, anode 126, cathode 128, line 86, resistance 87 and negative potentiol line 69. The rate of discharge of the "squeeze-delay" condenser 162 is regulated primarily by potentiometer resistance 167.

The action of "squeeze-delay" condenser 162 causes a potential picture at the grid 159 of thyratron 142 shown in Fig. 5 by a curve 159 in respect to the potential at the cathode 141 shown by the curve 141'. After the condenser 162 discharges, it will tend to charge in the reverse direction so that grid 159 will become positive with respect to negative potential line 69. However, the positive potential at 161 is limited by the rectifying device 170 to the potential of point 173 on voltage divider line 96 which is only slightly positive with respect to negative potential line 69. When the point 161 reaches this slightly positive potential, the rectifying tube 170 will conduct and prevent further rise in potential. Even though this slightly positive potential at point 161 appears at the grid 159 so that the grid 159 is slightly positive with respect to the cathode 141, the thyratron 142 will nevertheless still not conduct because of the potential in the shield grid 155 caused by the peaking circuit 152. The potential at the shield grid 155 may be shown by the curve 155' in Fig. 5 in which it is seen that the shield grid potential is maintained negative with respect to the cathode 141 throughout most of a full cycle of the alternating current souce 12. The alternating potential of the alternating current source 12 may be shown by curve 12' of Fig. 5. The potential of shield grid 155 peaks to zero only once each cycle of the alternating potential from source 12. Therefore, even though grid 159 is positive in respect to cathode 141, the thyratron 142 cannot conduct until the shield grid 155 reaches a peak. The point at which this peak is reached with respect to the alternating potential from source 12 may be adjusted from a phasing circuit 175.

In one such suitable phasing circuit 175, a transformer secondary 176 of the transformer 29, whose primary 30 is connected across the alternating current source 12 by lines 31 and 32, is connected in series with a capacitance 177 and two potentiometer resistances 178 and 179, respectively. One end of the primary 180 of peaking transformer 146 is connected at point 181 between the capacitance 177 and potentiometer resistance 178, and the other end of the primary 180 is connected to point 182 at the mid-point of the transformer secondary 176. By adjusting the resistance of potentiometers 178 and 179, the point at which the peaking circuit 152 will peak may be varied. A full explanation of the general operation of peaking circuits, such as 152, may be found in the patent application of Dawson and Faulk, Serial No. 733,901 filed March 11, 1947, now Patent No. 2,560,720. The firing of thyratron 142 is, therefore, synchronized by peaking circuit 152 with the alternating potential of source 12, and, in this instance, occurs at point 155' in curve 155 in Fig. 5.

As part of the "weld time" circuit 139, the line 157 in the anode 158 circuit of thyratron 142 is connected by line 183 to one side of the parallel connected "weld time" condensers 184 and 185. The other side of condenser 184 is connected by line 186 through resistance 187, potentiometer resistance 188 and minimum timing resistance 189 to the line 93. A switch arm 190 is, in this instance, arranged to connect the side 191 of capacitance 185 to the line 186 so that capacitances 184 and 185 are in parallel and operate as a single enlarged capacitance, which is desirable in the present instance of "pulsation welding." By moving the switch arm to the point 192, the resistances 187 and 188 are shorted out and the capacitance 185 is disconnected from the circuit so that a resulting small time constant is achieved, which is desirable for spot-welding operation to be later described. For additional flexibility in varying breadth of "weld time" in pulsation welding, a further switch 193 may be provided for shunting out the resistance at 187 along with adjustment of potentiometer resistance 188.

The "weld time" circuit 139 also inclues a "heat time" circuit 195, a "cool time" circuit 196 and a "weld-triggering" circuit 197. In the "heat time" circuit 195, a controlled ignition gas-filled discharge device, as thyratron 198, having an anode 199 connected by line 200 through resistance 201 to positive potential line 67, has a cathode 202 connected to line 203 which leads through a resistance 204 to the line 183 leading to the anode of the thyratron 142. A grid 205 of the thyratron 198 is connected to a peaking circuit 206 similar to the peaking circuit 152 and having a transformer secondary 207 at the transformer 146. The peaking circuit 206 is arranged to produce a varying potential at the grid 205 shown by the curve 205'''' in Fig. 5 wherein peaks occur midway between the peaks of the curve 155. The mid-point 208 of the transformer secondary 207 is connected to line 210, one end of which leads to the anode 211 of a rectifying device 212 whose cathode 213 is connected to line 172 which is connected to the point 173 which as stated is held slightly positive with respect to the negative potential line 69. The other side of the line 210 is connected through minimum resistance 214 and potentiometer resistance 215 to the positive potential line 93. A switch 216 which is kept open for pulsation welding, as in the present instance, may be closed to shunt out the potentiometer resistance 215 for spot-welding to be hereinafter described. Because of the rectifying device 212 connected by line 210 and point 208 to the grid 205, the potential of grid 205 will be slightly positive with respect to the cathode 202 of thyratron 198 when the thyratron 142 is conducting and the peaking circuit 206 reaches a peak. A timing capacitance 217 is connected between line 200, leading from the anode 199 of the thyratron 198, and line 218, one end of which leads to an anode 219 of the rectifying device 212, and the other end of which is connected through a minimum resistance 220 and a potentiometer resistance 221 to the positive potential line 93. The line 218 is connected to mid-point 222 of a transformer secondary 223 of transformer 146 in a peaking circuit 224, similar to peaking circuit 152, which is connected to bias grid 225 of a controlled-ignition gas-filled discharge device as thyratron 226 in the "cool time" circuit 196. Anode 227 of the thyratron 226 is connected by line 228 through resistance 229 to the positive potential line 67. A snuffing capacitance 230 is connected between lines 228 and 200 for inverter operation of thyratrons 226 and 198. A timing capacitance 231 is connected between line 228 and line 210 leading to the control grid 205 of thyratron 198. Two series-connected voltage divider resistances 232 and 233 are connected across the anode 227 and cathode 234 of the thyratron 226. The cathode 234 is connected by line 235 to the negative potential line 69. A midpoint 236 between voltage divider resistances 232 and 233 is connected to a shield grid 237 of a controlled-ignition gas-filled discharge device 238, such as a thyratron, in the weld triggering circuit 197. An anode 239 of the thyratron 238 is connected through the contactor 135 to one side of a primary 240 of a weld triggering transformer 37. The other side of the primary 240 is connected to the positive potential line 67. Grid 241 of the thyratron 238 is connected to a peaking circuit 242 similar to the peaking circuit 152 and having a secondary 243 of the transformer 146. Cathode 245 of the thyratron 238 is connected to line 246 which is connected by line 247 through resistance 248 to the negative potential line 69. Line 246 is also connected to cathode 249 of a controlled-ignition gas-filled discharge device 250, such as a thyratron, in the weld triggering circuit 197. Grid 251 of thyratron 250 is controlled by a peaking circuit 252 similar to the peaking circuit 152 and having a transformer secondary 254 on transformer 146. The peaking circuit 252 has additionally a potentiometer resistance 253 for balance control to be hereinafter described. The mid-points of the transformer secondaries 254 and 243 are connected to the line 247 leading to cathodes 245 and 249. Anode 255 of the thyratron 250 is connected to the positive potential line 67 by line 256. A snuffing capacitance 257 is connected between the anode 255 of thyratron 250 and terminal 136 in the anode circuit of thyratron 238 for inverter operation of thyratrons 238 and 250.

Before the thyratron 142 fired, the "weld time" capacitances 184 and 185 charged through the circuit consisting of positive potential line 67, resistance 158, line 183, condensers 184 and 185, point 191, switch 190, line 186, line 258, anode 259, cathode 171 of rectifying device 170, line 172, point 173, resistance 174, to negative potential line 69. In this manner, condensers 184, 185 charged with a potential positive in line 183 with respect to the line 186. Because of rectifying device 170, the potential of line 186 is normally maintained slightly positive with respect to the potential of line 69 and, therefore, grid 260 of a controlled-ignition gas-filled discharge device, as thyratron 261, in a "hold time" circuit 262, is at the same potential as line 186. However, since cathode 263 of thyratron 261 is connected by line 203, resistance 204, line 183, and resistance 158 to the positive potential line 67, the cathode 263 will be positive with respect to the grid 260 when thyratron 142 is nonconductive and, therefore, the thyratron 261 cannot fire. When the thyratron 142 began to conduct current, as explained above, the potential of line 183 dropped to nearly the potential of negative line 69 thus putting voltage across thyratron 261. However, the drop in potential in line 183, because of the charge on capacitors 184 and 185, simultaneously forces the potential of line 186 and, therefore, grid 260 far negative with respect to line 183 and, consequently, cathode 263 and, therefore, the thyratron 261 will still be unable to conduct. The potential of grid 260 with respect to line 183 may be shown by curve 260 with the line 183 potential shown by curve 183 in Fig. 5. The condensers 184 and 185 immediately begin to discharge through the circuit consisting of positive potential line 67, resistance 95, potentiometer arm 94, line 93, resistance 189, potentiometer resistance 188, resistance 187, line 186, capacitor 184, switch 190, point 191, capacitor 185, line 183, line 157, anode 156, cathode 141, point 134, contactor 132, point 133, line 138, and negative potential line 69. The rate at which the condensers 184 and 185 discharge is controlled primarily by potentiometer resistance 188 and resistance 187.

In the stand-by condition when potential first appeared across lines 67 and 69 and before the thyratron 142 began to conduct, the thyratron 226 being connected across the positive potential line 67 and the negative potential line 69 began to conduct as soon as its cathode became warm thereby charging the snuffing condenser 230 through the circuit composed of positive potential line 67, resistance 201, line 200, snuffing condenser 230, line 228, thyratron 226, line 235, and negative potential line 69. The side 200 of snuffing condenser 230 is thereby charged positively with respect to the side 228. Timing condenser 217 is also charged through the circuit, line 67, resistance 201, line 200, capacitance 217, line 218, rectifier 212, line 172, point 173, resistance 174, negative potential line 69, so that the side 200 is positive with respect to the side 218.

The thyratron 250 being connected across potential lines 67 and 69 also began to conduct during stand-by when potential first appeared across lines 67 and 69. The snuffing condenser 257 is thereby charged during stand-by with its side 136 positive with respect to side 256. As soon as the thyratron 142 began to conduct, the drop in potential in line 183 immediately put potential across the anode 199 and cathode 202 of the thyratron 198 so that thyratron 198 is in condition to fire as soon as its grid 205 permits. Due to the peaking circuit 206, the potential at grid 205 shown by curve 205 in Fig. 5 peaks at point 205'''' at the beginning of the half cycle of the alternating potential 12 following the half cycle in which firing point 155' of thyratron 142 occurred. Thyratron 198 thereby begins to conduct at the point 205' When the thyratron 198 begins to conduct, the potential of line 200 suddenly falls to nearly the potential of negative potential line 69 thereby causing the potential in line 228, due to the charge on condenser 230, to be forced far negative with respect to line 69 and shown by curves 228' and 69, respectively, in Fig. 5. The condenser 230 by this inverter action extinguishes the thyratron 226. At the same time, by similar inverter action effected by the biasing condenser 217, the potential in line 218 is brought far negative with respect to the cathode 234 shown by the curves 218 and 234, respectively, in Fig. 5. The line 218 being connected through the peaking circuit 224 to the grid 225 of the thyratron 226 will cause this low potential with respect to cathode 234 to appear at the grid 225. Thus, when the snuffing condenser 230 discharges quickly and charges with the opposite polarity through the circuit consisting of positive potential line 67, resistance 229, line 228, snuffing condenser 230, line 200, thyratron 198, resistance 204, line 183, thyratron 142, line 69, and a potential again appears across the thyratron 226, the negative potential at grid 225 prevents the thyratron 226 from again conducting. This is the start of "heat time" and the timing condenser 217 immediately begins to discharge through the circuit consisting of positive potential line 67, resistance 95, adjusting arm 94, line 93, potentiometer resistance 221, resistance 220, line 218, timing condenser 217, line 200, anode 199, cathode 202, resistance 204, line 183, line 157, anode 156, cathode 141, point 134, contactor 132, point 133, line 138, and negative potential line 69. The rate at which the timing condenser 217 discharges is controlled primarily by potentiometer resistance 221 and determines the length of "heat time." When the thyratron 198 began to conduct and the potential of line 218 was forced far negative, the rectifying device 212 stopped conducting. As the condenser 217 discharges, it will have a tendency to reverse its polarity so that the side 118 will become positive with respect to the side 200. However, the positive potential at 218 is limited by the rectifying device 212 to the potential of point 173 on the voltage divider line 96.

As soon as thyratron 226 was extinguished, a potential appeared at 236 between the voltage divider resistances 232 and 233. The resistances are chosen so that the potential at 236 will be the same as the potential appearing at the cathode 245 of the thyratron 238. Thus the shield grid 237 will be at the same potential and the thyratron 238 will be in condition to fire as soon as its grid 241 permits. A contactor 135 has closed the terminals 136 and 137 when the operator 64 was forced to the left at the time of discharge of the "squeeze" initiating thyratron 127. Due to the peaking circuit 242, the potential at grid 241 is made to appear with respect to cathode 245 as shown by curves 241 and 246 of Fig. 5 with the position of peaks determined by the setting on phasing circuit 175. Thus, in the half cycle of the alternating line potential 12 immediately following the firing of thyratron 198, a peak 241' will occur at the grid of thyratron 238 thereby causing it to fire. The moment thyratron 238 fires, it causes a sharp increase of current flow through the primary 240" as shown by the curve 240 in Fig. 5. This will, in turn, cause a voltage peak to occur in the secondaries 36 and 45 of the triggering transformer 37 shown by pulse 36 in Fig. 5. This pulse will overcome the negative bias at the thyratrons 15 and 16 caused by biasing circuits 27 and 40, respectively, so as to make a positive triggering pulse appear at the grids 25 and 38 thereby causing the thyratron with the proper polarity of line potential across it (in this instance 25) to conduct so as to ignite the ignitron 13 and make a pulse of current flow in the welding circuit through the weld load 49. The pulse of current may be shown by curve 49 in Fig. 5.

As soon as thyratron 238 is fired it causes, by inverter action on snuffing capacitance 257, the thyratron 250 to be extinguished. The potential in line 256 with respect to cathode 249 will appear as curves 256 and 246 in Fig. 5. The capacitance 257 rapidly discharges and recharges in the opposite direction through the circuit consisting of line 67, line 256, snuffing capacitance 257, point 136, contactor 135, point 137, anode 239, cathode 245, line 246, line 247, resistance 248 and negative line 69. When the capacitance 257 discharges, suitable firing potential will again appear across the thyratron 250 so that the thyratron 250 will again fire as soon as the potential at grid 251 permits. The potential at the grid 251 with respect to cathode 249, due to the peaking circuit 252, may be shown by curves 251 and 246 in Fig. 5. Since the peaks at grid 251 are displaced in phase by 180 degrees from the peaks appearing at grid 241 of thyratron 238, the grid 251 will peak in the succeeding negative half cycle of the alternating potential 12 at a point having the same relation as the point at which the thyratron 238 was caused to fire. The thyratron 250 will, therefore, be permitted to fire at this point 251' in the negative half cycle of alternating potential 12. When the thyratron 250 fires, it causes an inverter action on the snuffing capacitor 257 thus forcing the potential at point 136 far negative with respect to cathode 245 (shown by curves 136 and 246 in Fig. 5) thereby creating a potential drop across the transformer primary 240 in the same direction as the potential drop produced by the firing of the thyratron 238 and of about the same magnitude thereby causing an additional surge of current through the transformer primary 240, shown at 240'' on curve 240 in Fig. 5 which, in turn, causes a positive potential pulse to appear in the secondaries 36 and 45 of transformer 37, as shown by the curve 36'. This pulse overcomes the negative bias of the biasing circuits 27 and 40, as previously described, and triggers the thyratron 16 to conduct current to thereby ignite the ignitron 14 so as to cause a negative pulse of current to pass by means of transformer 10 through the welding load 49. The negative pulse of current may be shown by curve 49' and has the same magnitude and duration as the positive pulse 49 thereby providing proper balance and efficient operation of welding transformer 10. To insure such proper balance the potentiometer resistance 253 in peaking circuit 252 has been provided. By adjusting potentiometer resistance 253 the potential curve 251'' may be raised with respect to curve 246 thereby causing grid 251 to reach a proper firing potential at a point slightly before a peak is reached. Consequently thyratron 250 may be adjusted to fire at a point with respect to alternating potential 12 to exactly balance the point of firing of thyratron 238. The positive pulse appearing in the transformer secondary 45 will have a small negative flare which will have no effect upon the operation of the thyratrons 15 and 16 since once the positive portion has caused conduction, current will continue to flow thereafter independently of grid potential. When the thyratron 250 was again caused to conduct, it extinguished by inverter action of snuffing capacitor 257, the thyratron 238, which itself cannot again fire until its control grid 241 permits.

Assuming the line potential 12 to alternate in this instance at 60 cycles per second, the thyratrons 250 and 238 may be made to alternately fire in the above manner in each successive half cycle thereby causing alternate positive and negative pulses of welding current to flow through the welding resistance 49. This alternate firing will continue until "heat timing" condenser 217 has timed out, as shown at point 218' in Fig. 5, and the peaking circuit 224 has produced a zero peak at the grid 225 of the thyratron 226, shown at point 225' in curve 225'' illustrating the potential at grid 225. Thus, even though the condenser 217 has discharged, the thyratron 226 cannot conduct except at the proper point in the cycle of alternating potential 12 determined by the peaking circuit 224 which, in this instance, occurs at 225'. Due to capacitance 217 and peaking circuit 224, the potential at the grid 225 will appear as curve 225'' and is normally coincident with curve 205. When the thyratron 226 again conducts at the point 225', it extinguishes the "heat timing" thyratron 198 by inverter action of the snuffing capacitance 230. The potential of line 209 with respect to line 69 and therefore cathode 202 appears as curves 209' and 69' in Fig. 5. By similar action, capacitance 231 forces the potential at line 210 far negative with respect to potential of line 69 and appears through the peaking circuit 206 at the grid 205 of thyratron 198 as the drop 205'. The "cool time" capacitance 231 immediately begins to discharge through the circuit consisting of positive potential line 67, potentiometer resistance 95, adjusting arm 94, line 93, potentiometer resistance 215, resistance 214, line 210, timing capacitance 231, line 228, anode 227, cathode 234, line 235, and negative potential line 69. The rate at which the capacitance 231 discharges is controlled primarily by the potentiometer resistance 215. Before the thyratron 198 may again conduct, the capacitance 231 must discharge to point 205'' and the peaking circuit 206 must have effected a peak at grid 205 after discharge of capacitance 231, in this instance shown by the point 205'''.

As soon as thyratron 226 began to conduct, the potential in line 228 dropped to nearly the negative potential of line 69 which, due to resistance 248, is lower than the potential at line 246. The shield grid 237 of the thyratron 238, being connected through point 236 and resistance 232 to line 228, will thereby have a correspondingly low potential. Thus, the shield grid 237 will prevent the thyratron 238 from further conduction. This negative biasing potential on the shield grid 237 may be shown by curve 237 in Fig. 5. It is seen that when this biasing potential occurs in shield grid 237, if the thyratron 238 is conducting, it will continue to conduct until extinguished by the conduction of thyratron 250 after which it can no longer fire. If the thyratron 238 was already extinguished at the time the biasing potential in 237 occurred, it cannot again be triggered to conduct peaking circuit 242. Therefore, it is seen that the welding current during "heat time" will always begin with a pulse of one polarity 49 and will always end with a pulse of the opposite polarity 49'' with only an even number of current pulses occurring during "heat time" thereby equalizing the positive and negative pulses through the transformer 10.

After the "cooling time" determined by the discharge of condenser 231 and the peaking circuit 206, the thyratron 198 will again be made to conduct to repeat the cycle of "heat" and "cooling" times explained above. While this repetitive action continues, the weld timing capacitors 184 and 185 discharge as shown by curve 260'', thus effecting the same potential at the grid 260 of the thyratron 261. It should be noted here that when the thyratron 198 conducts, it causes current to flow through the resistance 204 thereby effecting a potential rise in line 203. The resistance 204 is chosen so that the potential rise in line 203 will be of such a magnitude that the potential at the cathode 263 will be higher than the maximum possible positive potential at the grid 260 of thyratron 261. The maximum positive potential at the grid 260 is determined by the line 258 which leads to the rectifying device 170 whose cathode is connected to the point 173 by line 172 on voltage divider line 96. Therefore, if the thyratron 198 is conducting, even though the capacitances 184 and 185 have timed out, the thyratron 261 cannot fire until the thyratron 198 is extinguished. The rise in potential of cathode 263 when the thyratron 198 conducts current through the resistance 204 may be shown by curve 263' in Fig. 5, and in a similar manner, if thyratron 198 is extinguished and the thyratron 261 conducts, it causes current to flow through the resistance 204 thereby effecting a potential rise in the cathode 202 which is more positive than the maximum possible positive potential in grid 205 thereby preventing the thyratron 198 from conducting after the thyratron 261 has started to conduct. Thus, if thyratron 198 is conducting when the "weld time" capacitances 184 and 185 time out, as in this instance shown by curve 260, the thyratron 162 will wait until the thyratron 198 is extinguished by inverter action of thyratron 226 after which it will conduct at the point 263'' thereby preventing the thyratron 198 from conducting thereafter. Note that this arrangement does not permit cutting short of any "heat time" period and insures an integral number of full "heat time" periods.

The "hold time" circuit 262 has additionally a "hold time" capacitor 270 connected between lines 266 and 271. One side of line 271 is connected through resistance 272 and potentiometer resistance 273 to the positive potential line 93, and the other side of line 271 is connected through resistance 274 to grid 275 of sequence terminating circuit 276. Line 271 is connected by line 277 to anode 278 of rectifying device 99 whose cathode 100 is connected to point 102 of the voltage divider line 96 thereby limiting the maximum positive potential at 271 to approximately that of the point 102 which is slightly positive with respect to line 203 when thyratron 261 is conducting. The other side of the capacitance 270 is connected by line 279 through resistance 280 to the line 281, one end of which is connected to cathode 282 of the thyratron 283 and the other end of which is connected through capacitance 284 and line 106 to the point 104 between capacitor 88 and rectifying device 88' in the "off time" and repeat circuit 82. During stand-by, the capacitance 270 charges through the circuit consisting of positive potential line 67, line 266, capacitance 270, line 277, anode 278, cathode 100, point 102, resistance 285, point 173, resistance 174 and negative potential line 69 so that the side 266 is positive with respect to the side 271. When the thyratron 260 started to conduct, because of the charge on capacitor 270, the line 271 was brought far negative with respect to negative potential line 203, when thyratron 261 is conducting, thereby producing at grid 275 the same negative potential. At the same time the cathode 282 is brought to the potential of line 266 in the anode circuit of thyratron 261 which is nearly at the negative potential of line 203 when thyratron 261 is conducting. Thus, the thyratron 276 is ready to conduct as soon as permitted by its grid 275. "Hold time" condenser 270 immediately starts to discharge through the circuit consisting of the positive potential line 67, resistance 95, adjusting arm 94, line 93, potentiometer resistance 273, resistance 272, line 271, "hold time" capacitance 270, line 266, anode 265, cathode 263, line 203, resistance 204, line 183, line 157, anode 156, cathode 141, point 134, contactor 132, point 133, line 138 and negative potential line 69. The rate of discharge is controlled primarily by the potentiometer resistance 273. The potential picture at control grid 275 with respect to cathode 282 may be shown by the curves 275 and 282, respectively, in Fig. 5. When the control grid 275 reaches a potential slightly positive with respect to the cathode 282, the thyratron 283 will discharge so as to cause current to flow through the resistance 280 thereby effecting a potential rise in 281 which appears through capacitor 284 and line 106 to overcome the negative biasing potential at grid 105 of thyratron 85' thereby causing thyratron 85' to fire. When thyratron 85' fires, capacitance 81 extinguishes thyratron 127 by inverter action. At the same time grid-biasing capacitance 90 causes grid 129 to be forced far negative with respect to the potential of the cathode 128. Thus, while the snuffing capacitance 81 discharges rapidly because of a low time constant, the capacitance 90 will prevent thyratron 127 from again firing. When thyratron 127 ceases to conduct, the coil 66 is deenergized and tension spring 65 moves the operator 64 to the right, thereby opening contacts at 63, 119, 132 and 135. By this action solenoid 57 is deenergized and pressure on electrode 47 is removed; conduction through thyratron 142 and cascaded thyratrons 261 and 283 is stopped; terminals 136 and 137 are opened so as to insure against possible firing of thyratron 238.

If the foot switch 107 is in the open position when thyratron 127 is extinguished so that terminals 108 and 109 are open, solenoid 111 is deenergized and tension spring 120' moves operator 120 to the left, opening line 124 and preventing the thyratron 127 from further conducting and the apparatus is again in position ready for another sequence, as explained above.

If foot switch 107 is in the closed position so that points 108 and 109 are closed, the solenoid 111 remains energized and the line 124 remains closed by contactor 123, and thyratron 127 will conduct to start another sequence, as explained above, when capacitance 90 has discharged through the circuit consisting of positive potential line 67, resistance 95, adjusting arm 94, line 93, potentiometer resistance 92, resistance 91, repeat switch 89', line 89, "off-time" capacitor 90, line 84, anode 85, cathode 86', line 86, resistance 87, and negative potential line 69. The rate of discharge of "off-time" capacitor 90 is controlled primarily by potentiometer resistance 92.

If repeat switch 89' is switched to point 89" so that line 89 is open in front of resistance 91, and if the foot switch 107 is held in the closed position so that inductance coil 111 is energized leaving line 122 open, the "off-time" capacitor 90 cannot discharge, and therefore prevents the thyratron 127 from conducting indefinitely. By means of this feature, the repetition of the sequence may be prevented until the foot switch 107 is raised, thereby deenergizing the coil 111 and causing line 122 to close, and discharge "off-time" condenser 90 through the circuit consisting of line 84, line 122, contactor 121, point 89", switch 89', line 89, and condenser 90. The line 124 being open, thyratron 127 cannot again fire until the foot switch 107 is depressed.

The rectifying device 88' effectively prevents an unwanted phenomenon from occurring. For example, when the switch 107 is depressed and line 124 is closed, thyratron 127 fires and extinguishes thyratron 85'. If the contactor 123 bounces, as contactors often do, the line 124 is momentarily open thereby causing the thyratron 127 to be extinguished. The biasing capacitance 90 has acquired sufficient charge through the line 97 from rectifying device 99 to permit the thyratron 127 to refire when the bouncing contactor 123 again closes the line 125. However, if the rectifying device 88' were not present, the bias on grid 105 may have been lost during this small bouncing interval when both thyratrons 127 and 85' were extinguished so that thyratron 85' may refire thereby preventing the thyratron 127 from again refiring and the sequence sticks until the capacitance 90 is again discharged, as explained above. By inserting the rectifying device 94, loss of charge of biasing capacitance 93 is prevented thereby preventing the unwanted refiring of thyratron 85' and neutralizing the bouncing effect of contactor 123.

The above described apparatus may be used for spot-welding by moving the switch arm 190 to the terminal 192 and thus disconnecting the capacitance 185 and shunting out resistances 187 and 188. In such case, the capacitor 184 is discharged very rapidly. The thyratron 261 in the "hold time" circuit 262 thereby becomes ready to fire before the end of the first "heat period" and waits, as explained above, while the thyratron 198 is conducting. As soon as the thyratron 198 is extinguished at the end of the "heat period," the thyratron 261 immediately conducts causing current to flow through resistance 204 so as to raise the cathode potential of thyratron 198 to a point where it cannot refire, as explained above.

Briefly summarizing, the sequence of operations described above is as follows:

1. Foot switch 107 is closed to energize solenoid 111 thereby moving operator 120 to the right.

2. The thyratron 127 in the sequence-initiating and "squeeze delay" circuit conducts and energizes the inductance coil 66 thereby moving the operator 64 to the left, at the same time extinguishing thyratron 85' in the "off-time" and "repeat" circuit 82.

3. The contactor 63 causes solenoid 57 to be energized; contactor 119 seals in switch 107 to make the circuit "non-beat"; contactor 132 closes the cathode circuit of thyratron 142 in the "weld time" circuit 139; and contactor 135 closes the anode circuit of thyratron 238 in the triggering circuit 197.

4. After "squeeze delay," thyratron 142 conducts starting "weld interval" timing and applying voltage to thyratron 198 in the "heat time" circuit 195.

5. Thyratron 198 conducts at zero voltage with respect to line at the start of the half cycle following the one in which thyratron 142 started conduction. Thyratron 198 extinguishes thyratron 226 in the "cool time" circuit 196 which allows the shield grid potential in thyratron 238 to rise to the same potential as its cathode 245, thus removing shield biasing from thyratron 238.

6. At the proper point in the half cycle as determined by the "phase shift heat control circuit" 175, the thyratron 238 conducts, generating triggering voltage in the secondaries 36 and 45 of transformer 37, and at the same time extinguishing thyratron 250.

7. In the next half cycle, thyratron 250 becomes conductive at an identical point in the half cycle as the thyratron 238 did in the preceding half cycle, and extinguishes the thyratron 238 and causes another triggering pulse to appear in the secondaries 36 and 45 of transformer 37. This inverter action continues until the end of the first "heat period."

8. At the end of the "heat period," thyratron 226 again conducts, extinguishing thyratron 198 and returning biasing voltage to the shield grid 237 of thyratron 238 to stop the inverter action of the triggering circuit 197.

9. At the end of "cool time," thyratron 198 again conducts and the cycle repeats until the "weld interval" times out.

10. The "weld interval" having timed out, if during a "cool time," thyratron 261 in the "hold time" circuit 262 immediately conducts. If during a "heat time," thyratron 261 waits until the end of the "heat period" and then conducts ending the "weld interval" and starting "hold time."

11. At the end of "hold time," thyratron 283 in the "sequence-terminating circuit" conducts and pulses the grid of thyratron 85' which conducts and extinguishes thyratron 127 which permits the operator 64 to move to the right.

12. If set for spot operation, step 9 above is omitted and the thyratron 261 conducts immediately after the end of the first "heat period."

It should be noted that by connecting the anode circuit of one thyratron to the cathode circuit of a succeeding thyratron, as illustrated by thyratrons 142, 261 and 283, a very useful cascade arrangement is obtained whereby the current flow in the entire cascade arrangement may be extinguished from a single switch in the circuit of the leading thyratron thereby resetting the whole arrangement. Such an arrangement also permits the use of a simple resistance, as resistance 204, in the cathode circuits of succeeding thyratrons for controlling the point of firing of the succeeding thyratrons.

The inductance coil 66 besides controlling operator 64 is arranged to serve another useful purpose. When the thyratron 127 is extinguished, the current in the highly inductive coil 66 is cut off rapidly. This causes a rise of inductive voltage in the coil which is kept within reasonable limits by resistance 83. This rise makes point 68 highly positive and is in series with the circuit charging "squeeze delay" capacitance 162 which must be completely recharged during "off" time. Consequently, capacitance 162 is recharged very rapidly with the resistance 165 being inserted to prevent overcharging. This is one of the factors contributing to the high speeds obtainable in the present invention. For example, in spot-welding, 400 spots per minute may be obtained. The other timing capacitances have longer periods in which to recharge.

The unit is self-compensating for line voltage variations. For example, the value of charge voltage on capacitance 270 is a function of the voltage between line 67 and point 102 which is a function of voltage between lines 67 and 69. The discharge of capacitance 270 for timing described above is also a function of the voltage between lines 67 and 69. Consequently, if the line voltage is low, the original charge on capacitance 270 is low, but since the discharging voltage will also be low, the same timing will result.

The potentiometer resistance 95 is provided to compensate, for example, for tolerances in parts by providing a slight variation in the discharge voltage.

From the above operational description, it is noted that the technique of driving both grid and cathode of a thyratron negative simultaneously has been extensively used. A contributing factor to the high stability achieved in this type of operation is the provision of a capacitor directly across the grid and cathode in circuits, which during stand-by, bring the positive potential of line 67 to the cathode and charge these capacitors so as to maintain the grid negative with respect to the cathode. Such arrangements may be seen, for example, in thyratrons 142, 261 and 283 where the capacitors remain unnumbered.

Figure 2:
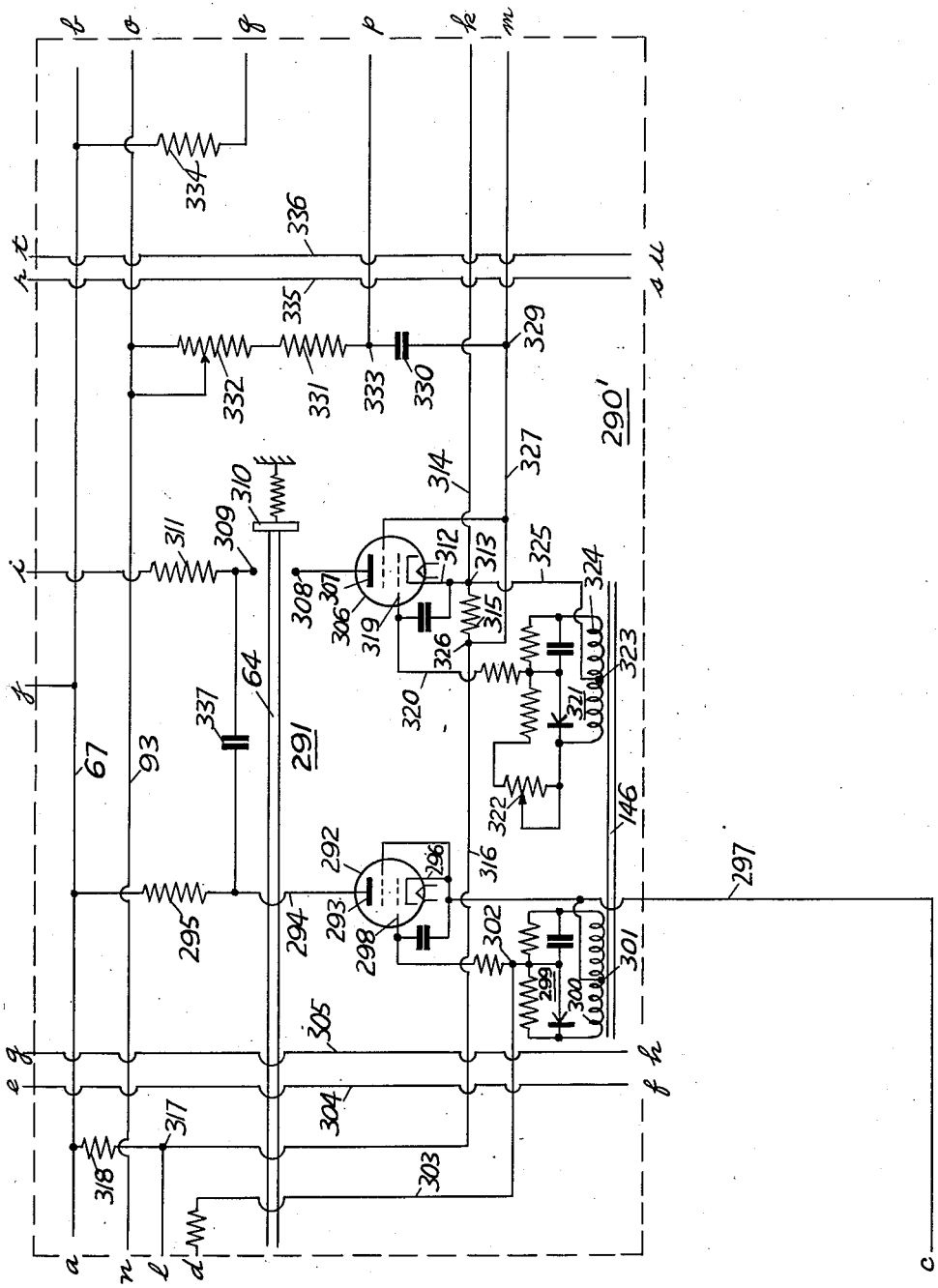
Fig. 2 is a schematic view of circuits for providing a second embodiment of the invention adapted for synchronous spot-welding.

In a second embodiment of the present invention, the portion 290 in Fig. 1 blocked in by broken lines is replaced by 290' in Fig. 2 to form a synchronous spot-welding and sequence timer. In this embodiment, the triggering circuit 291 replaces the triggering and "heat" and "cool" time circuits 197, 195 and 196. In the triggering circuit 291, controlled-ignition gas-filled discharge device 292, such as a thyratron, has anode 293 connected by line 294 through resistance 295 to the positive potential line segment 67 which is connected to the rest of the positive potential line 67 at points $a$ and $b$. Cathode 296 is connected through line 297 to the negative potential line 69 at the point $c$ and grid 298 is connected to a grid-biasing peaking circuit 299 which is preferably similar to the peaking circuit 152. The secondary 300 of transformer 146 in the peaking circuit 299 has its midpoint 301 connected to line 297 running to cathode 296. Point 302 in the output of the peaking circuit 299 is connected by line 303 at the point $d$ running to the shield grid 155 of thyratron 142 in the "weld time" circuit 139. Line 304 is inserted between points $e$ and $f$, and line 305 is inserted between $g$ and $h$ to include the transformer secondary 28 in the grid-biasing circuit 27. A controlled-ignition gas-filled discharge device 306, such as a thyratron, has an anode 307 connected by means of points 308 and 309 and contactor 310 of operator 64 through a resistance 311 to point $i$ in the primary 240 of triggering transformer 37. The other side of the primary 240 is connected at point $j$ to line 67. Cathode 312 is connected to the point 313 in line 314.

The line 314 is connected at point $k$ to line 203 running to cathode 263 of thyratron 261 in the "hold time" circuit 262. The other end of 314 runs to point 313 which is connected through resistance 315, line 316, point 317, and point $l$ to the anode 156 of thyratron 142 in the "weld time" circuit 139. The anode 156 is also connected through resistance 318 to the positive potential line 67. Grid 319 of thyratron 306 is connected by line 320 to the output of peaking circuit 321 which is preferably similar to the peaking circuit 252 and has an adjusting potentiometer resistance 322 for raising and lowering the output potential form of peaking circuit 321. Mid-point 323 of secondary 324 of transformer 146 is connected by line 325 through point 313 to cathode 312 of thyratron 306. Point 326 in the line 316 is connected by line 327 through the point $m$ to shield grid 328 of the thyratron 261. Point 329 of line 327 is connected through capacitance 330, resistance 331, and potentiometer resistance 332 to the positive potential line segment 93 whose ends are connected to the rest of line 93 at points $n$ and $o$. Point 333 between resistance 331 and capacitance 330 is connected at the point $p$ to the grid 260 circuit of thyratron 261. Line 266 from the anode 265 of thyratron 261 is connected through point $q$ and resistance 334 to the positive potential line 67. Line 335 and line 336 are connected between $r$ and $s$, and $t$ and $u$, respectively, to include the transformer secondary 41 in grid-biasing circuit 40. Snuffing condenser 337 is connected between line 294 and point 309 in the anode circuits of thyratrons 292 and 306.

Figure 6:
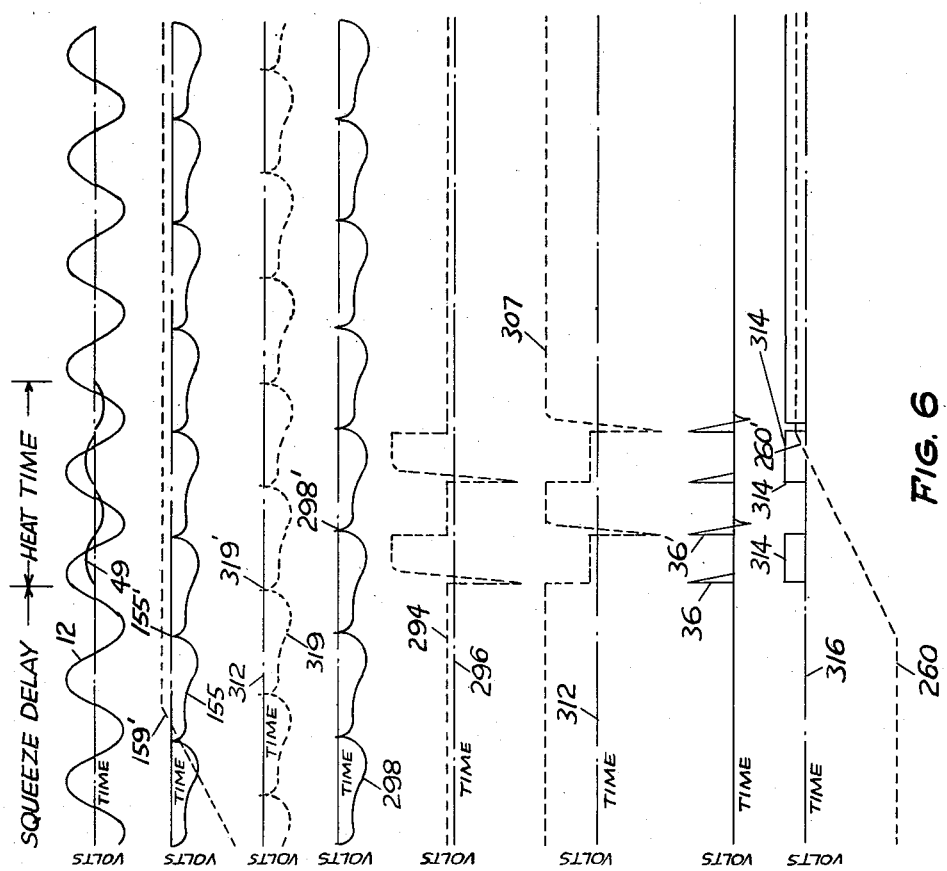
Fig. 6 shows curves illustrating the operation of Fig. 2.

When the power in the sequence and spot-weld timer is first turned on, the potential between lines 67 and 69 appears across the thyratron 292 in the triggering circuit 291, because of lines 294 and 297. The thyratron 292 will, therefore, conduct during stand-by and will charge the condenser 337 with the point 309 positive with respect to the line 294. When the condenser 162 has timed out, as shown at 159' in Fig. 6, the thyratron 142 will, nevertheless, be kept from firing by the negative potential at its shield grid from the peaking transformer 299, which may be shown as curve 155 in Fig. 6. In the next half cycle of the alternating potential 12 after the "squeeze-delay" capacitor 162 has timed out, the peaking circuit 299 will produce a peak at a point 155' determined by a setting on phasing circuit 175 thereby permitting thyratron 142 to fire. The "weld time" capacitance 330 had, during stand-by, charged through the circuit consisting of line 67, resistance 318, point 317, line 316, point 326, line 327, point 329, capacitance 330, point 333, point p, line 258, anode 259, cathode 171, line 172, point 173, resistance 174, negative potential line 69 so that the side 329 is positive with respect to the side 333. The instant thyratron 142 is fired, because of the charge on capacitance 330, potential of point 333 and therefore grid 260 of thyratron 261 is forced far negative with respect to the potential in line 316 and cathode 263 so that thyratron 261 cannot fire, even though the firing of thyratron 142 created voltage across the thyratron 261. The potential of grid 260 with respect to line 316 is shown by curves 260 and 316 in Fig. 6. The "weld timing" condenser 330 immediately begins to discharge through the circuit consisting of line 67, resistance 95, adjusting arm 94, line 93, potentiometer resistance 332, resistance 331, point 333, condenser 330, point 329, line 327, point 326, line 316, point 317, point l, anode 156, cathode 141, point 134, contactor 132, point 133, line 138, and negative potential line 69. The rate of discharge of the "weld time" condenser 330 is controlled primarily by the potentiometer resistance 332.

The firing of thyratron 142 with its consequent drop in potential of line 316 thereby also puts voltage across the thyratron 306. The points 309 and 308 have previously been closed by the contactor 310 of the operator 64 when induction coil 66 was energized. The thyratron 306 is, therefore, ready to fire as soon as permitted by the potential of its grid 319. The potential on the grid 319, due to the peaking circuit 321, appears with respect to cathode 312 as curve 319 in Fig. 6 and has a phase relation causing peaks to occur 180 degrees from the peaks caused by the peaking circuit 299 shown by curve 298. Therefore, in the half cycle of line potential 12 following the firing of thyratron 142, the thyratron 306 will be permitted to fire, as at point 319'. The firing of thyratron 306 will extinguish, by inverter action of condenser 337, the thyratron 292. This action is shown by curve 294' showing potential of line 294 with respect to cathode 296. At the same time, a high current rise occurs in a transformer primary 240 thereby producing a positive peak in secondaries 36 and 45 of transformer 37 shown by curve 36. Due to the peaking circuit 299, the thyratron 292 will again be permitted to conduct at an identical point 298' in the next half cycle of alternating potential 12 thereby extinguishing the thyratron 238 and producing another positive peak 36' in transformer secondaries 36 and 45. The inverter operation of the triggering circuit 291 will continue to produce peaks in the positive and negative half cycles of the alternating potential source 12 to cause welding current pulses 49''' through the load resistance 49, as explained with regard to triggering circuit 197 in the first embodiment, and will continue until thyratron 261 fires. When the capacitance 330 times out as at point 260', the thyratron 261 is ready to fire and will fire immediately if the thyratron 306 is extinguished thereby passing current through resistance 315 which raises the potential of cathode 312 above the maximum positive potential which may appear at the grid 319 so that thyratron 306 cannot thereafter fire. If the thyratron 306 is conducting at the time the capacitance 303 times out, as in the present instance, the thyratron 306 will cause current to flow through resistance 315 thereby raising the potential in line 314, shown by curve 314'. Therefore, cathode 263 of thyratron 261 will be above the maximum positive potential that may appear at the grid 260, thereby making the thyratron 261 wait until the thyratron 306 is extinguished before the htyratron 261 is permitted to fire. By means of this feed-back arrangement through resistance 315, it is seen that only an even number of current pulses will be caused to flow in the welding transformer 10 and the operation will automatically be full cycling. The other operations in the sequence have been heretofore explained with regard to the first embodiment.

Figure 3:
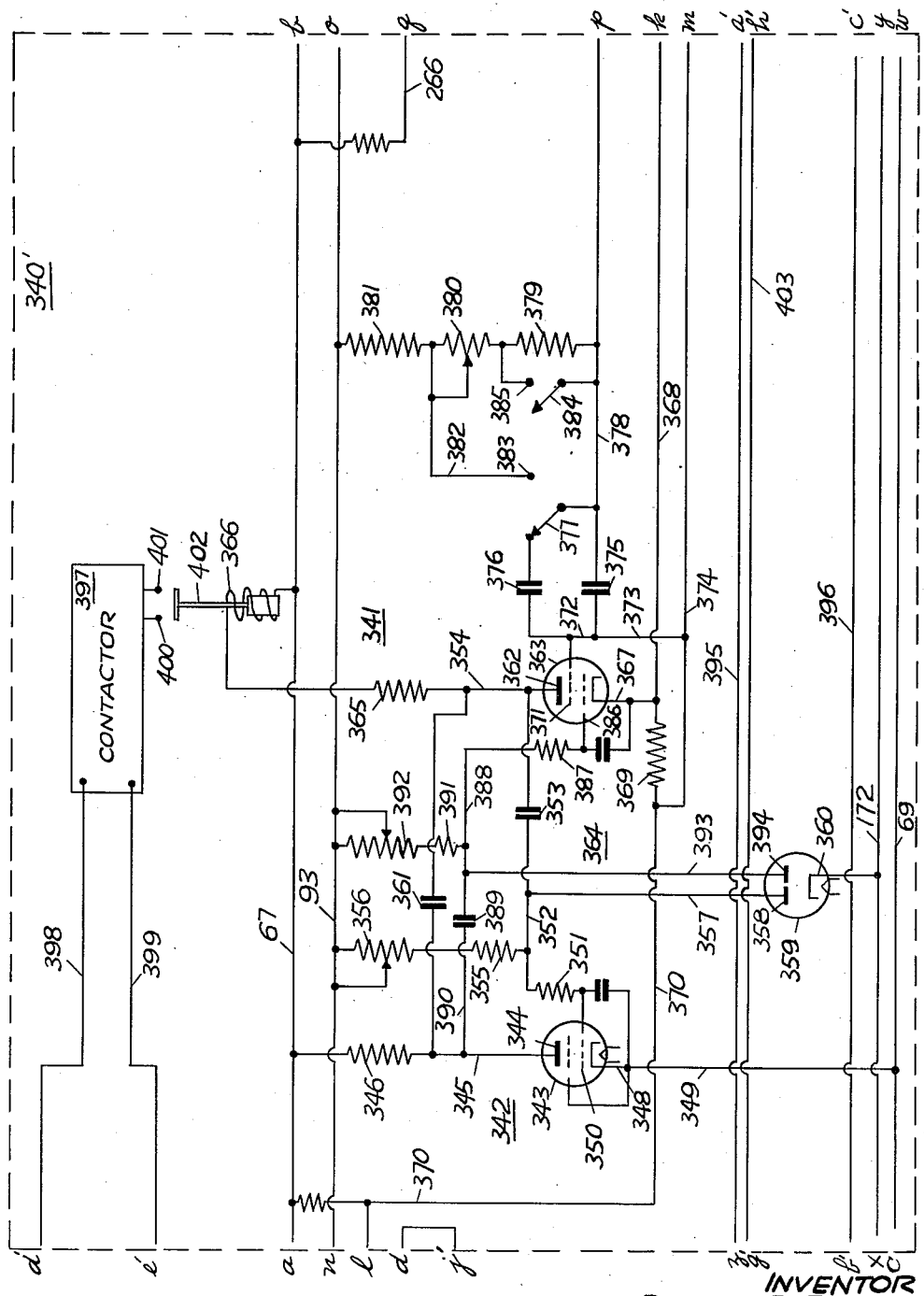
Fig. 3 is a schematic view of circuits for providing a third embodiment of the invention adaptable for nonsynchronous pulsation and spot-welding.

In a third embodiment, the invention forms a non-synchronous pulsation and spot-welding timer by removing the portion enclosed in the broken line 340 and inserting the portion 340' in Fig. 3. In this embodiment a pulsation timing circuit 341 is inserted in place of the triggering and pulsation circuits in the first embodiment. In the pulsation circuit 341 a "cool time" circuit 342 has a controlled-ignition gas-filled discharge device 343, such as a thyratron, having an anode 344 connected by line 345 through resistance 346 to positive potential line segment 67 whose ends are connected to the rest of line 67 at points a and b. Cathode 348 is connected by line 349 to negative potential line segment 69 whose ends are connected to the rest of line 69 at points c and w. Control grid 350 of thyratron 343 is connected through resistance 351, line 352 and timing capacitance 353 to line 354. Line 352 is connected through resistance 355 and potentiometer resistance 356 to line segment 93 whose ends are connected to the rest of line 93 at point n and o. Line 352 is also connected by line 357 to anode 358 of rectifying device 359 having a cathode 360 connected to line segment 172 the ends of which are connected to the rest of line 172 at points x and y. Anode 344 is also connected by line 345 through a snuffing capacitance 361 to line 354 leading to anode 362 of a grid-controlled gaseous discharge device 363 in a "heat time" circuit 364. The anode 362 is connected through line 354, resistance 365 and solenoid coil 366 to positive potential line 67. Cathode 367 is connected to line 368, one end of which leads through point k to line 203 leading to cathode 263 of thyratron 261 in the "hold time" circuit 262. The other end of line 368 leads through resistance 369, line 370 and through point l to the anode 156 of thyratron 142 in the "weld time" circuit 139. Shield grid 371 of thyratron 363 is connected to point 372 in line 373 which is connected to line 374 leading from the line 370 to the shield grid 328 of thyratron 261 in the "hold time" circuit 262 through the point m. The point 372 is connected to one side of parallel condensers 375 and 376; the other side of condensers 375 and 376 may be connected in parallel by switch arm 377 to the line 378 leading to the point p in the grid 260 circuit of thyratron 261. The line 378 is connected through resistance 379, potentiometer resistance 380, and minimum resistance 381 to the positive potential line 93. Resistances 380 and 379 may be shunted out by line 382, point 383, and switch arm 377. The resistance 379 may be shunted out by connecting switch arm 384 to the point 385. Grid 386 of thyratron 363 is connected through resistance 387, line 388, grid biasing capacitance 389, and line 390 to line 345 in the anode circuit of thyratron 343. Line 388, on one side of capacitance 389, is connected through resistance 391 and potentiometer resistance 392 to line 93. Also line 388 is connected through line 393 to anode 394 of rectifying device 359. The line 395 is inserted to connect points $z$ and $a'$ of line 97, the line 396 is inserted to connect the point $b'$ and $c'$ of line 106 and line 403 is inserted to connect points $g'$ and $h'$ of line 258. Any suitable contactor 397, for connecting alternating current source 12 to the weld load 49, is connected by line 398 to the point $d'$ and by line 399 to point $e'$. The contactor 397 is controlled at points 400 and 401 which may be closed and opened by operator 402 operated by the solenoid 366.

Figure 7:
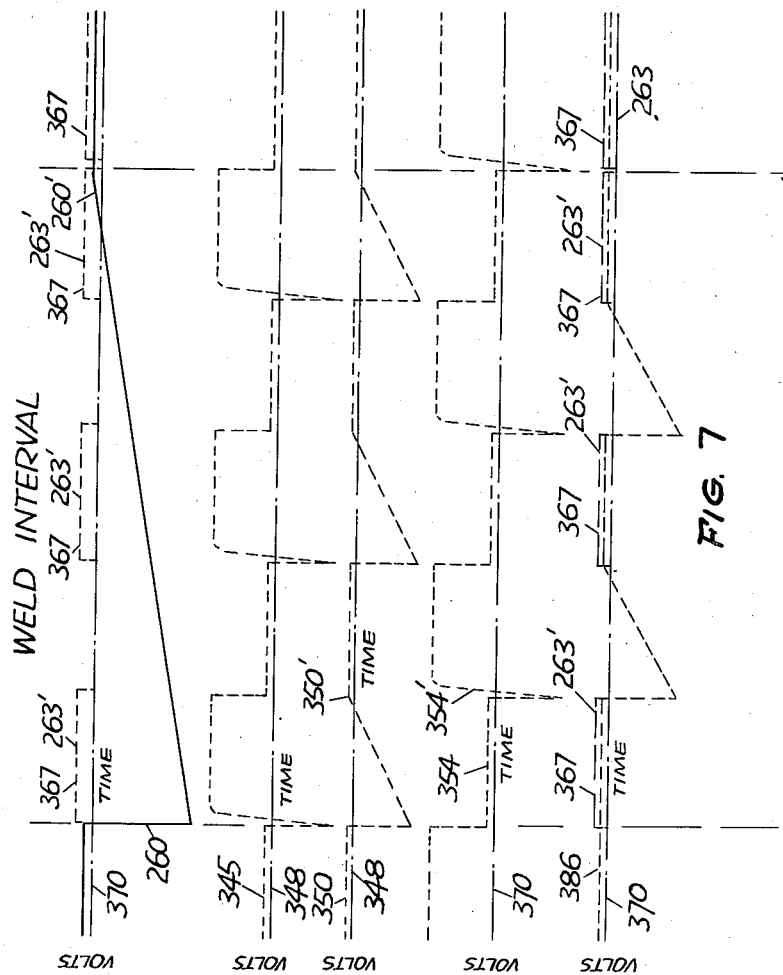
Fig. 7 shows curves illustrating the operation of Fig. 3.

During stand-by, the potential between lines 67 and 69 appears across the thyratron 343, whose grid 350 being slightly positive in respect to its cathode 48, because of connection through rectifying device 359 to line 172, will make thyratron 343 normally conductive. The snuffing condenser 361 will thereby be charged through the line 67, solenoid 366, resistance 365, point 354, snuffing condenser 361, line 345, anode 344, cathode 348, line 349, and negative potential line 69 with the side 354 positive with respect to the side 345. Because of rectifying device 359, line 388 and therefore grid 386 of thyratron 363 will be slightly positive with respect to line 69 during this stand-by conduction of thyratron 343. Also during stand-by, the condenser 353 in the "heat time" circuit 364 charges through the circuit consisting of positive potential line 67, inductance coil 366, resistance 365, line 354, capacitance 353, line 357, anode 358, cathode 360, line 172, point 173, resistance 174 and anode potential line 69 so that the side 354 is positive with respect to the side 357. During stand-by, the "weld time" interval condensers 375 and 376 charge through the circuit consisting of line 67, line 370, line 374, line 373, point 372, capacitances 375 and 376, switch arm 377, line 378, point $p$, line 258, anode 259, cathode 171, line 172, point 173, resistance 174, and negative potential line 69 so that the point 372 is positive with respect to the line 378. During stand-by, the positive potential of line 67 appears at cathode 367 of thyratron 363 in the "heat time" circuit 364 through the circuit 67, line 370, resistance 369, line 368, cathode 367 so that the thyratron 363 will not fire while thyratron 142 is non-conductive. The instant the thyratron 142 fires, the potential in line 370 drops, thereby putting voltage across the thyratron 363, and at the same time, because of capacitances 376 and 375, carries the potential at grid 260 for thyratron 261 in the "weld time" circuit 262 far negative with respect to line 370 and therefore cathode 263. This may be seen in Fig. 7 by the curve 260 which represents the potential of the grid 260 and the curve 370 which represents the relative potential of the line 370. Therefore, even though the drop in potential of line 370 also puts voltage across the thyratron 261, the thyratron cannot fire. The capacitances 375 and 376 immediately begin to discharge through the circuit consisting of line 67, resistance 95, arm 94, line 93, resistance 381, potentiometer resistance 380, resistance 379, line 378, capacitances 375 and 376, point 372, line 373, line 374, line 370, point $l$, anode 156, cathode 141, point 134, contactor 132, point 133, line 138, and negative potential line 69. At the moment that the potential in line 370 dropped, thereby causing voltage to appear across the thyratron 363, the thyratron 363 conducts. When thyratron 363 conducts, it causes current to flow through the inductance coil 366 so as to make the operator 402 move upward, thereby closing the gap between the points 400 and 401 to operate the contactor 397 so as to permit current to flow from the alternating current source 12 through the weld load 49. At the instant the thyratron 363 begins to conduct, it also causes, by inverter action of capacitance 361, the thyratron 344 to be extinguished. The potential picture in line 345 leading to the anode 344 of thyratron 343 is shown by the curve 345 in Fig. 7. The potential there shown is with respect to the potential at the cathode 348 shown by the curve 348'. Because of the charge on the capacitance 353, as explained above, the instant thyratron 363 conducts, the grid 350 of the thyratron 343 is forced far negative with respect to the cathode 348, as shown by the curves 350 and 348, respectively, in Fig. 7. Therefore, even though capacitance 361 rapidly discharges because of a low time constant, the capacitance 353 prevents thyratron 343 from again firing until the capacitance 353 has discharged to a point where the grid 350 will be slightly positive with respect to the cathode 348. The capacitance 353 immediately begins to discharge through the circuit consisting of line 67, resistance 95, adjusting arm 94, line 93, potentiometer resistance 356, resistance 355, line 352, capacitance 353, line 354, anode 362, cathode 367, line 368, resistance 369, line 370, point $l$, anode 156, cathode 141, point 134, contactor 132, point 133, line 138, and negative potential line 69. The rectifying device 359 connected to the line 352 prevents the capacitance 353 from recharging in the opposite direction beyond a potential slightly higher than negative potential line 69. Thyratron 343 will again conduct when capacitance 353 discharges to point 350' where the grid 350 becomes slightly positive with respect to the potential at cathode 348. When the thyratron 343 again fires, it extinguishes thyratron 363 by inverter action of capacitance 361 thereby ending "heat time" and starting "cool time." The potential in line 354 leading to anode 362 with respect to line 370 is shown by curves 354 and 370, respectively. When the thyratron 343 fires, because of the charge on "cool time" capacitance 389, grid 386 of thyratron 363 is forced far negative with respect to the potential of line 370. Cathode 367, being at the potential of line 370, thereby prevents refiring of thyratron 363, even though capacitance 361 has rapidly discharged and recharged in the opposite direction as at 354'. Current flow will cease in inductance coil 366 and operator 402 will drop back to stop current flow to the weld load 49. The resulting potential picture of the control grid 386 is shown by curve 386' with respect to potential 370. The "cool time" condenser 389 immediately begins to discharge through the circuit composed of line 67, resistance 95, adjusting arm 94, line 93, potentiometer resistance 392, resistance 391, capacitance 389, line 390, line 345, thyratron 343, line 349, and negative potential line 69, at a rate controlled primarily by the potentiometer resistance 392. When the "cool time" capacitor 389 has timed out, the thyratron 363 will again fire and the cycle will be repeated. The cycle, as explained above, will continue to repeat until "weld interval" capacitors 375 and 376 time out according to the curve 260'' to 260' where the grid 260 of the "hold time" thyratron 261 becomes slightly positive with respect to cathode 263 and thyratron 261 may fire. If the "weld interval" capacitances 375 and 376 time out while thyratron 363 is firing, the thyratron 261 will, nevertheless, be unable to fire because current from thyratron 363 flowing through resistance 369 will cause cathode 263 to rise in potential to a point above the potential of control grid 260, as shown by the curve 263'. Thyratron 261 will therefore wait until "heat time" ends and thyratron 363 is extinguished, at which time the thyratron 361 will immediately fire, thereby causing current to flow again in resistance 369 raising the potential of cathode 367 above the maximum possible positive potential of grid 386 so that thyratron 363 will be unable to fire again and the "weld interval" is ended. It is seen, as explained earlier, that this feed-back arrangement with the resistance 369 insures an integral number of full "heat periods."

This embodiment is also adaptable to spot-welding, for example, by disconnecting capacitance 376 by means of switch 377 being connected to point 383, and also thereby shunting out resistances 380 and 379. The time constant is reduced to where capacitance 370 times out before the first "heat" cycle ends, thereby making thyratron 261 fire immediately after thyratron 363 is extinguished at the end of the first "heat" cycle.

Figure 4:
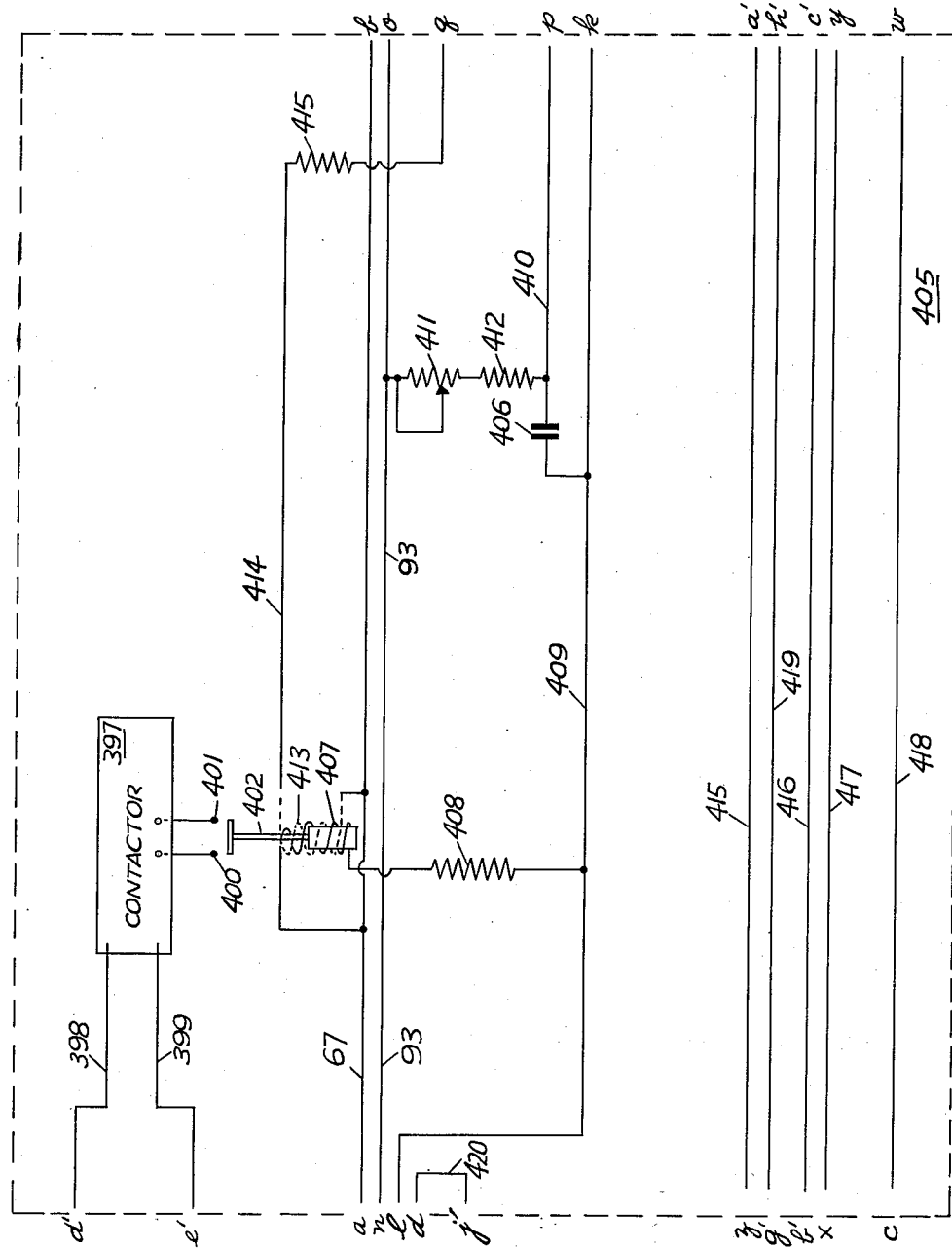
Fig. 4 is a schematic view of circuits for providing a fourth embodiment of the invention adapted for nonsynchronous spot-welding.
Figure 8:
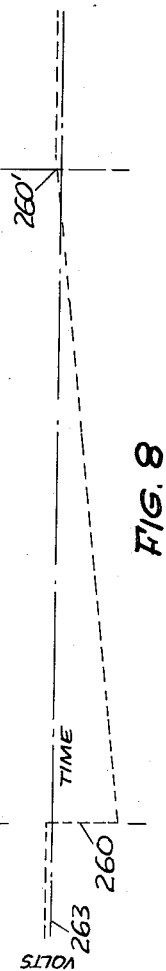
Fig. 8 shows curves illustrating the operation of Fig. 4.

In a fourth embodiment, the portion enclosed in dotted lines 340 is replaced by 405 of Fig. 4 to form a non-synchronous sequence spot-welding timer. In this embodiment, the "weld time" capacitance 406 is charged during stand-by through the circuit consisting of line segment 67, which is connected at points a and b to the rest of line 67, inductance coil 407, resistance 408, line 409, capacitance 406, line 410, point p, line 258, rectifying device 170, line 172, point 173, resistance 174, and negative potential line 69 so that the charge at 410 is negative with respect to the charge at 409. When the capacitance 162 times out, thyratron 142 fires, thereby causing the potential in line 409, which is attached at point $l$ to anode 156, to drop, thereby forcing the potential of the control grid 260 far negative with respect to cathode 263 as shown by the curves 260 and 263 in Fig. 8. Also current will be made to flow through the solenoid 407 so as to cause the operator 402 to close the gap between the points 400 and 401 thereby causing contactor 397 to connect a current source as, for example, source 12 through transformer 10 to the welding load 49. The capacitance 406 begins immediately to discharge through the circuit consisting of line 67, resistance 95, adjusting arm 94, line segment 93, which is connected at points n and o to the rest of line 93, potentiometer resistance 411, resistance 412, line 410, capacitance 406, line 409, point $l$, thyratron 142, point 134, contactor 132, point 133, line 138, and negative potential line 69. When the capacitance 406 discharges to the point 260' where grid 260 becomes slightly positive with respect to cathode 263, thyratron 261 discharges thereby causing current to flow through the circuit, consisting of line 67, solenoid 413, line 414, resistance 415, point q, line 266, thyratron 261, line 203, point k, line 409, point $l$, thyratron 142, point 134, contactor 132, point 133, line 138 and negative potential line 69. The current in solenoid 413 being in a direction opposite to that of solenoid 407 causes a neutralization of fields, thereby causing operator 402 to fall back and disconnect the points 400 and 401 so as to end the "weld interval." Line 415 is inserted to connect the points z and a' of line 97; line 416 is inserted to connect the points b' and c' of line 106; line 417 is inserted so as to connect the points x and y of line 172; line 418 is inserted so as to connect the points c and w of line 69; line 419 is inserted to connect the points g' and h' of line 258; and line 420 is inserted to connect points d and j' to connect shield grid 155 to cathode 141. The rest of the circuit in this embodiment operates as discussed with regard to the first embodiment above.

This invention is not limited to the particular details of construction and processes described, as many equivalents will suggest themselves to those skilled in the art. It is accordingly desired that the appended claims be given a broad interpretation commensurate with the scope of the invention within the art.

What is claimed is:

1. A timing system for use in supplying current through a load from a voltage source comprising means for controlling current from said source through said load, a pair of cascade connected controlled-ignition gas-filled discharge devices, means responsive to current flow in the leading one of said discharge devices for causing said controlling means to conduct current through said load, means responsive to current flow in the other of said discharge devices for causing said controlling means to stop current flow in said load, means for causing current to flow in said one discharge device, time control means effective only while said one discharge device is conductive for causing said other discharge device to conduct, and means for extinguishing said one discharge device thereby extinguishing said other discharge device.

2. A timing system for use in supplying current through a load from a voltage source comprising means for controlling current from said source through said load, a pair of cascade connected controlled-ignition gas-filled discharge devices, means responsive to current flow in the leading one of said discharge devices for causing said controlling means to conduct current through said load, said responsive means including an inductive device in the path of said current flow, means responsive to current flow in the other of said discharge devices for causing said controlling means to stop current flow in said load, said last-mentioned responsive means including an inductive device in the path of current of said other discharge device and positioned to nullify the field of said first-mentioned inductive device, means for causing current to flow in said one discharge device, time control means effective only while said one discharge device is conductive for causing said other discharge device to conduct, and means for extinguishing said one discharge device thereby extinguishing said other discharge device.

3. A timing system for use in supplying current through a load from a voltage source comprising means for controlling current from said source through said load, three cascade connected controlled-ignition gas-filled discharge devices, means responsive to current flow in the first of said discharge devices for causing said controlling means to conduct current through said load, means responsive to current flow in the second of said discharge devices for causing said controlling means to stop current flow in said load, means for causing current to flow in said first discharge device, time control means effective only while said first discharge device is conductive for causing said second discharge device to conduct, time control means effective only while said second discharge device is conductive for causing the third of said discharge devices to conduct, and means responsive to current flow in said third discharge device for extinguishing said first discharge device thereby extinguishing said other discharge devices.

4. A timing system for use in supplying current through a load from a voltage source comprising means for controlling current from said source through said load, three cascade connected controlled-ignition gas-filled discharge devices, means responsive to current flow in the first of said discharge devices for causing said controlling means to conduct current through said load, means responsive to current flow in the second of said discharge devices for causing said controlling means to stop current flow in said load, means for causing current to flow in said first discharge device, time control means effective only while said first discharge device is conductive for causing said second discharge device to conduct, and means responsive to current flow in said third discharge device for opening the circuit of said first discharge device thereby extinguishing said three discharge devices.

5. A timing system for use in supplying current through a load from a voltage source comprising means for controlling current from said source through said load, a pair of cascade connected controlled-ignition gas-filled discharge devices, means responsive to current flow in the leading one of said discharge devices for causing said controlling means to conduct current through said load, means responsive to current flow in the other of said discharge devices for causing said controlling means to stop current flow in said load, means for causing current to flow in said one discharge device, a resistance capacitance circuit effective only while said one discharge device is conductive for causing said other discharge device to conduct, and means for extinguishing said one discharge device thereby extinguishing said other discharge device.

6. A timing system for use in supplying current through a load from a voltage source comprising means for controlling current from said source through said load, three cascade connected controlled-ignition gas-filled discharge devices, means responsive to current flow in the first of said discharge devices for causing said controlling means to conduct current through said load, said responsive means including an inductive device in the path of said current flow, means responsive to current flow in the second of said discharge devices for causing said controlling means to stop current flow in said load, said last-mentioned responsive means including an inductive device in the path of current of said other discharge device and positioned to nullify the field of said first-mentioned inductive device, means for causing current to flow in said first discharge device, a resistance capacitance circuit effective only while said one discharge device is conductive for causing said other discharge device to conduct, a resistance capacitance circuit effective only while said second discharge device is conductive for causing the third of said discharge devices to conduct, and means responsive to current flow in said third discharge device for opening the circuit of said first discharge device thereby extinguishing said three discharge devices.

7. A timing system for use in supplying current through a load from a voltage source comprising means for controlling current from said source through said load, three cascade connected controlled-ignition gas-filled discharge devices, means responsive to current flow in the first of said discharge devices for causing said controlling means to conduct current through said load, means responsive to current flow in the second of said discharge devices for causing said controlling means to stop current flow in said load, means for causing current to flow in said first discharge device, time control means effective only while said first discharge device is conductive for causing said second discharge device to conduct, time control means effective only while said second discharge device is conductive for causing the third of said discharge devices to conduct, an impedance in the path between said second and third discharge devices, and means responsive to voltage rise in said path from current flow in said third discharge device for opening the circuit of said first discharge device thereby extinguishing said three discharge devices.

8. A timing system for use in supplying current through a load from a voltage source comprising means for controlling current from said source through said load, three controlled-ignition gas-filled discharge devices, one of said devices having each of the other two of said devices in cascade arrangement therewith, means responsive to current flow in a second of said three devices for causing said controlling means to conduct current through said load, time control means effective only while said one device is conductive for alternately making said second device conductive and nonconductive, means for causing said one device to conduct, time control means responsive to current flow in said one device for causing said third device to conduct, a resistance between said one device and said other two devices in said cascade arrangement for making said time control means for said second device ineffective while said third device is conductive and said time control means for said third device ineffective while said second device is conductive, and time control means responsive to current flow in said third device for extinguishing said first device thereby extinguishing said three devices.

9. In a timing system, three controlled-ignition gas-filled discharge devices, one of said devices having each of the other two of said devices in cascade arrangement therewith, time control means effective only while said one device is conductive for alternately making a second of said devices conductive and non-conductive, means for causing said one device to conduct, time control means responsive to current flow in said one device for causing a third of said devices to conduct, a resistance between said one device and said other two devices in said cascade arrangement for making said time control means for said second device ineffective while said third device is conductive and said time control means for said third device ineffective while said second device is conductive, and time control means for extinguishing said first device thereby extinguishing said three devices.

10. In a timing system, a pair of cascade connected controlled-ignition gas-filled discharge devices, a resistance in the path between said devices, means for causing current to flow in the leading one of said devices, time control means for alternately making the other of said devices conductive and non-conductive, time control means for causing current to flow through said resistance thereby making said last-mentioned conductive means ineffective, and means for extinguishing said one device.

11. A timing system for use in supplying current through a load from an alternating voltage supply comprising a pair of inverse parallel connected ignitrons arranged for connecting said supply to said load, means for firing said ignitrons, three controlled-ignition gas-filled discharge devices, one of said devices having each of the other two of said devices in cascade arrangement therewith, a fourth controlled ignition gas-filled discharge device and a potential source for making said fourth device normally conductive, a condenser connected for inverter operation of said fourth device and a second of said three devices, means responsive to the start of conduction in said second device and the start of conduction in said fourth device for causing at each of said starts said firing means to fire the ignitron having suitable potential from said voltage supply, control means effective only while said one device is conductive for causing said second device to conduct at a selected point in a half cycle of said alternating voltage thereby extinguishing said fourth device by inverter action of said condenser, control means for causing said fourth device to become conductive at a selected point in a succeeding half cycle of said alternating voltage thereby extinguishing said second device by inverter action of said condenser, means for causing said one device to conduct at a selected point in the cycle of said voltage supply, time control means responsive to current flow in said one device for causing a third of said devices to conduct, current responsive voltage means between said one device and said other two devices in said cascade arrangement for making said control means for said second device ineffective while said third device is conductive and said control means for said third device being ineffective while said second device is conductive, and time control means responsive to current flow in said third device for extinguishing said first device thereby extinguishing said three devices.

12. A timing system for use in supplying current through a load from an alternating voltage supply comprising a pair of inverse parallel connected ignitrons arranged for connecting said supply to said load, means for firing said ignitrons, a pair of controlled-ignition gas-filled discharge devices, a condenser connected for inverter operation of said devices, a potential source arranged to make one of said devices normally conductive, means responsive to conduction in the other of said devices and conduction in said one device for causing at each of said conductions said firing means to fire the ignitron having suitable potential from said voltage supply, control means for causing said other device to conduct at a selected point in a half cycle of said alternating voltage thereby extinguishing said one device by inverter action of said condenser, control means for causing said one device to become conductive at a selected point in a succeeding half cycle of said alternating voltage thereby extinguishing said second device by inverter action of said condenser, and means for preventing said other device from becoming conductive.

13. A system as in claim 12 wherein said last-mentioned means comprises a pair of inverter operated controlled-ignition gas-filled discharge devices, one of said last-mentioned pair being coupled to said other device in said first-mentioned pair to make said control means for said other device ineffective while said one of said last-mentioned pair is conductive, time control means for causing inversions in said last-mentioned pair, and means for preventing the other of said last-mentioned pair from conducting.

14. In a timing system a pair of controlled-ignition gas-filled discharge devices, a condenser connected for inverter operation of said devices, means arranged to synchronize firing of said devices with a source of alternating potential, time control means for causing inverter operation of said devices, and time control means for stopping said operation.

15. In a timing system a pair of controlled-ignition gas-filled discharge devices, a condenser connected for inverter operation of said devices, peaking circuits arranged to synchronize firing of said devices with a source of alternating potential, time control means for causing inverter operation of said devices, and time control means for stopping said operation.

16. In a timing system two pair of controlled-ignition gas-filled discharge devices, means for causing inverter operation of each of said pairs of devices, a voltage divider circuit across one of said devices in one of said pairs, said circuit being arranged to control operation of said other pair, time control means for starting inverter operation of said one pair, and time control means for stopping said operation of said one pair.

17. In a timing system, a pair of cascade connected gas-filled discharge devices, means for causing current to flow in a first device in said cascade, time control means for causing current to flow in a second of said discharge devices, and means for extinguishing said first device thereby extinguishing said second device.

18. In a timing system, three cascade connected gas-filled discharge devices, means for causing current to flow in a first device in said cascade, time control means responsive to current flow in said first discharge device for causing current to flow in a second of said discharge devices, time control means responsive to current flow in said second discharge device for causing current to flow in a third of said devices, and means responsive to current flow in said third device for extinguishing said first device thereby extinguishing all of said devices.

19. In a timing system, three cascade connected gas-filled discharge devices, means for causing current to flow in a first device in said cascade, time control means responsive to current flow in said first discharge device for causing current to flow in a second of said discharge devices, time control means responsive to current flow in said second discharge device for causing current to flow in a third of said devices, an impedance in the cathode path of said third discharge device for causing a potential rise from current flow in said path, and means responsive to said potential rise for extinguishing said first device thereby extinguishing all of said devices.

20. In a timing system, a pair of gas-filled discharge devices, means responsive to current flow in one of said devices for creating an inductive field in one direction, means responsive to current flow in the other of said devices for nullifying the inductive field in said last-mentioned means, means for causing current to flow in said one device, time control means responsive to current flow in said one device for causing current to flow in said other device, and time control means responsive to current flow in said other device for extinguishing both of said devices.

21. In a timing system a pair of gas-filled discharge devices, an operating member, a pair of inductively coupled coils operatively arranged with said member, one of said coils electrically connected to one of said discharge devices to cause an inductive field in one direction, the other of said coils electrically connected to said other discharge device to cause an inductive field nullifying said first-mentioned field, means for causing current to flow in said one device, time control means responsive to current flow in said one device for causing current to flow in said other device, and time control means responsive to current flow in said other device for extinguishing both of said devices.

22. In a timing system a source of direct potential, a pair of grid-controlled gas-filled discharge devices connected in parallel across said source, a capacitor connected to effect inverter extinguishing action between said devices, means responsive to current flow in said parallel connection for creating negative bias at the grid of one of said devices, normally open switch means in the path of current flow in said other device, time control means responsive to current flow in said other device for causing said one device to conduct, and time control means responsive to current flow in said one device and effective only while said switch is closed for causing said other device to conduct effecting cyclic operation of said devices.

23. In a timing system a source of direct potential, a pair of grid-controlled gas-filled discharge devices connected in parallel across said source, a capacitor connected to effect inverter extinguishing action between said devices, means responsive to current flow in said parallel connection for creating negative bias at the grid of one of said devices, normally open switch means in the path of current flow in said other device, time control means responsive to current flow in said other device for causing said one device to conduct, and means responsive to the closing of said switch means for preventing said other device from again conducting thereby preventing cyclic operation of said devices.

24. In a timing system a source of direct potential, a pair of grid-controlled gas-filled discharge devices connected in parallel across said source, a capacitor connected to effect inverter extinguishing action between said devices, means responsive to current flow in said parallel connection for creating negative bias at the grid of one of said devices, normally open switch means in the path of current flow in said other device, time control means responsive to current flow in said other device for causing said one device to conduct, time control means responsive to current flow in said one device and effective only while said switch is closed for causing said other device to conduct effecting cyclic operation of said devices, means responsive to the closing of said switch means for causing said last-mentioned control means to prevent said other device from again conducting thereby preventing cyclic operation of said devices, and means for operatively connecting and disconnecting said last-mentioned means.

25. In a timing system two pair of controlled-ignition gas-filled discharge devices, means arranged to synchronize firing of said devices with a source of alternating potential, means for causing inverter operation of each of said pairs of devices, a voltage divider circuit across one of said devices in one of said pairs, said circuit being arranged to control operation of said other pair, time control means for starting inverter operation of said one pair, and time control means for stopping said operation of said one pair.

DONALD P. FAULK.

REFERENCES CITED

The following references are of record in the file of this patent:

UNITED STATES PATENTS

| Number | Name | Date |
| --- | --- | --- |
| 2,359,142 | Murcek | Sept. 26, 1944 |
| 2,372,128 | Smith | Mar. 20, 1945 |
| 2,421,995 | Cooper | June 10, 1947 |
| 2,473,238 | Bivens | June 14, 1949 |